(12) United States Patent
Faulkner

(10) Patent No.: US 12,356,117 B2
(45) Date of Patent: Jul. 8, 2025

(54) TRANSITIONING OF MEETING ENGAGEMENT BY TRANSITIONING VIEWING PERSPECTIVES TO A TEMPORARY VIEWING PERSPECTIVE SHOWING CLUSTERS OF GROUP ACTIVITY

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 189 days.

(21) Appl. No.: 18/091,285

(22) Filed: Dec. 29, 2022

(65) Prior Publication Data

US 2024/0223729 A1 Jul. 4, 2024

(51) Int. Cl.
*H04N 7/15* (2006.01)
*G06T 7/70* (2017.01)
*G06T 17/00* (2006.01)

(52) U.S. Cl.
CPC .............. *H04N 7/157* (2013.01); *G06T 7/70* (2017.01); *G06T 17/00* (2013.01); *H04N 7/152* (2013.01)

(58) Field of Classification Search
CPC .......... H04N 7/157; H04N 7/152; G06T 7/70; G06T 17/00; G06T 15/20; G06F 3/04815; G06Q 10/1095

See application file for complete search history.

(56) References Cited

U.S. PATENT DOCUMENTS

| 2016/0227262 A1* | 8/2016 | Grant | H04N 21/8545 |
| 2022/0066229 A1* | 3/2022 | Hansen | G02B 27/283 |
| 2022/0264055 A1* | 8/2022 | Foessel | H04N 23/69 |

FOREIGN PATENT DOCUMENTS

WO 2022066229 A1 3/2022

OTHER PUBLICATIONS

International Search Report and Written Opinion received for PCT Application No. PCT/US2023/036216, Feb. 14, 2024, 12 pages.

* cited by examiner

*Primary Examiner* — Yosef K Laekemariam
(74) *Attorney, Agent, or Firm* — Scott Y. Shigeta; Newport IP, LLC

(57) ABSTRACT

The disclosed techniques provide promotion of engagement by transitioning viewing perspectives to a temporary viewing perspective showing clusters of group activity. A system shows each person a view of a large virtual environment, e.g., in a stadium full of representations of meeting attendees. Each person sees the virtual environment from a point of view originating from each person's representation, e.g., a first-person avatar view. When a group activity meets one or more conditions, the system determines parameters of a temporary perspective view from a point-of-view of a virtual camera based on the positions of people in a cluster of representations. The parameters of the temporary perspective view can be selected to show a threshold number of representations found in a cluster in a virtual environment. The system can then transition the view of each member of the group from a first-person perspective to the point-of-view of the virtual camera.

20 Claims, 23 Drawing Sheets

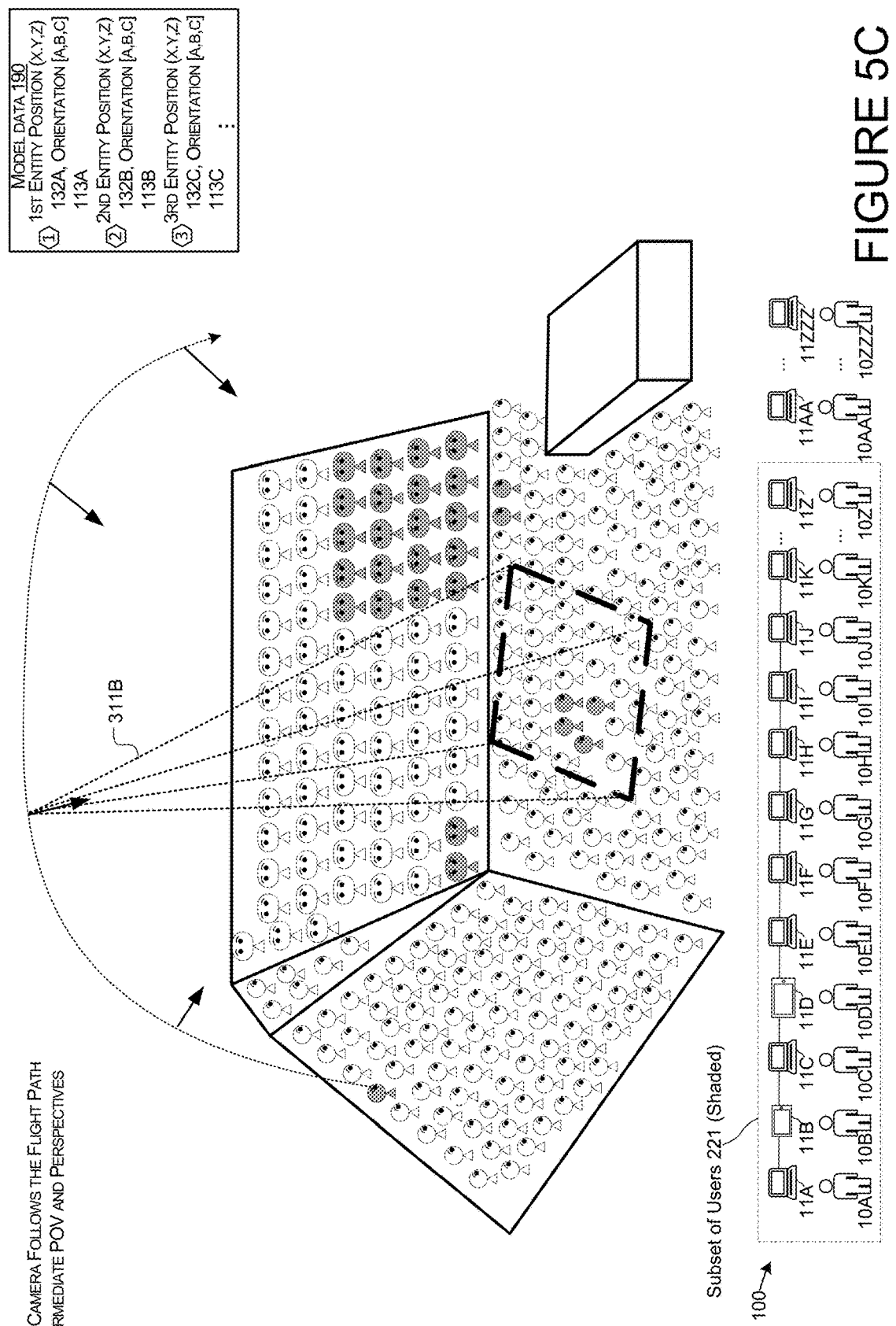

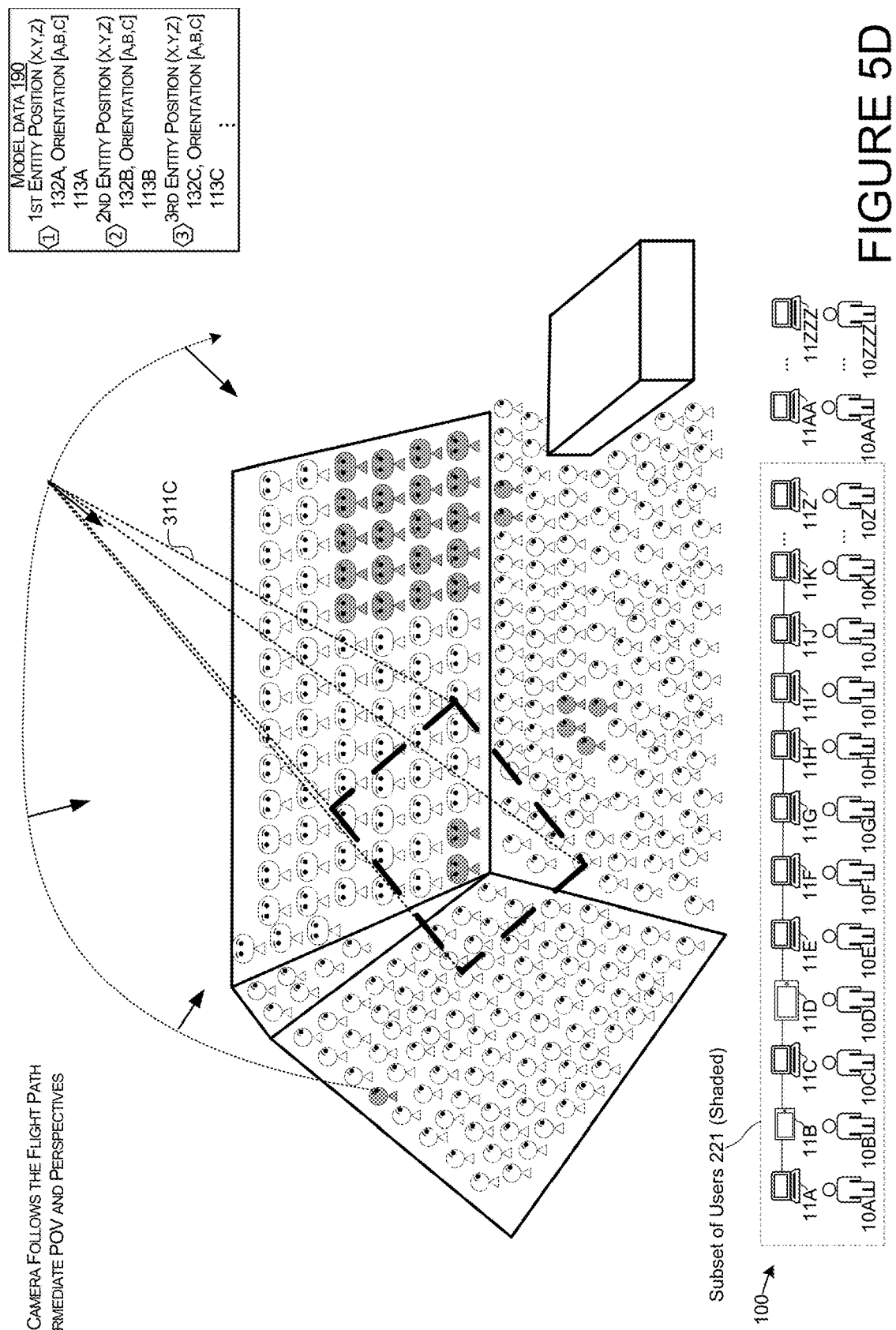

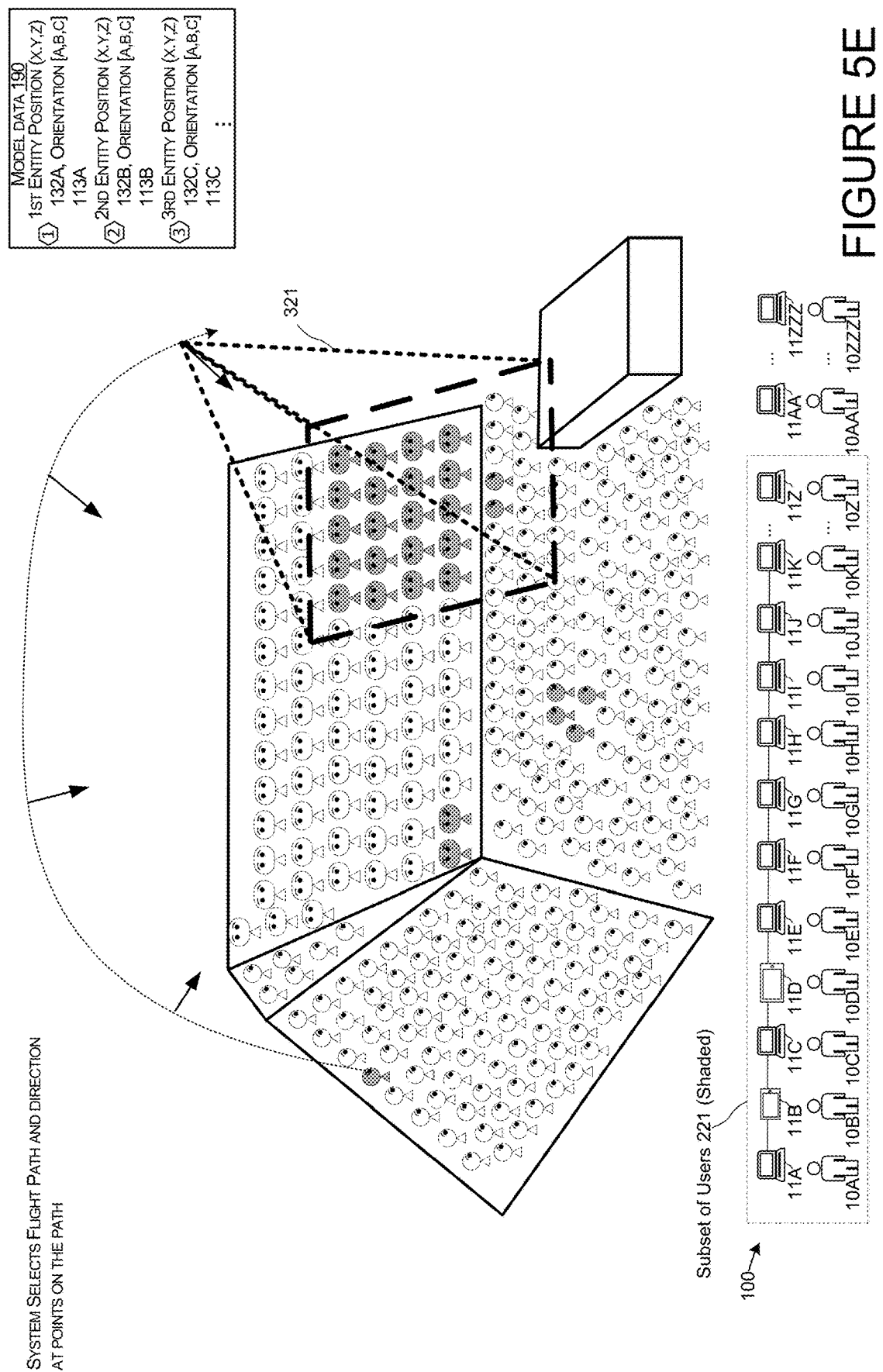

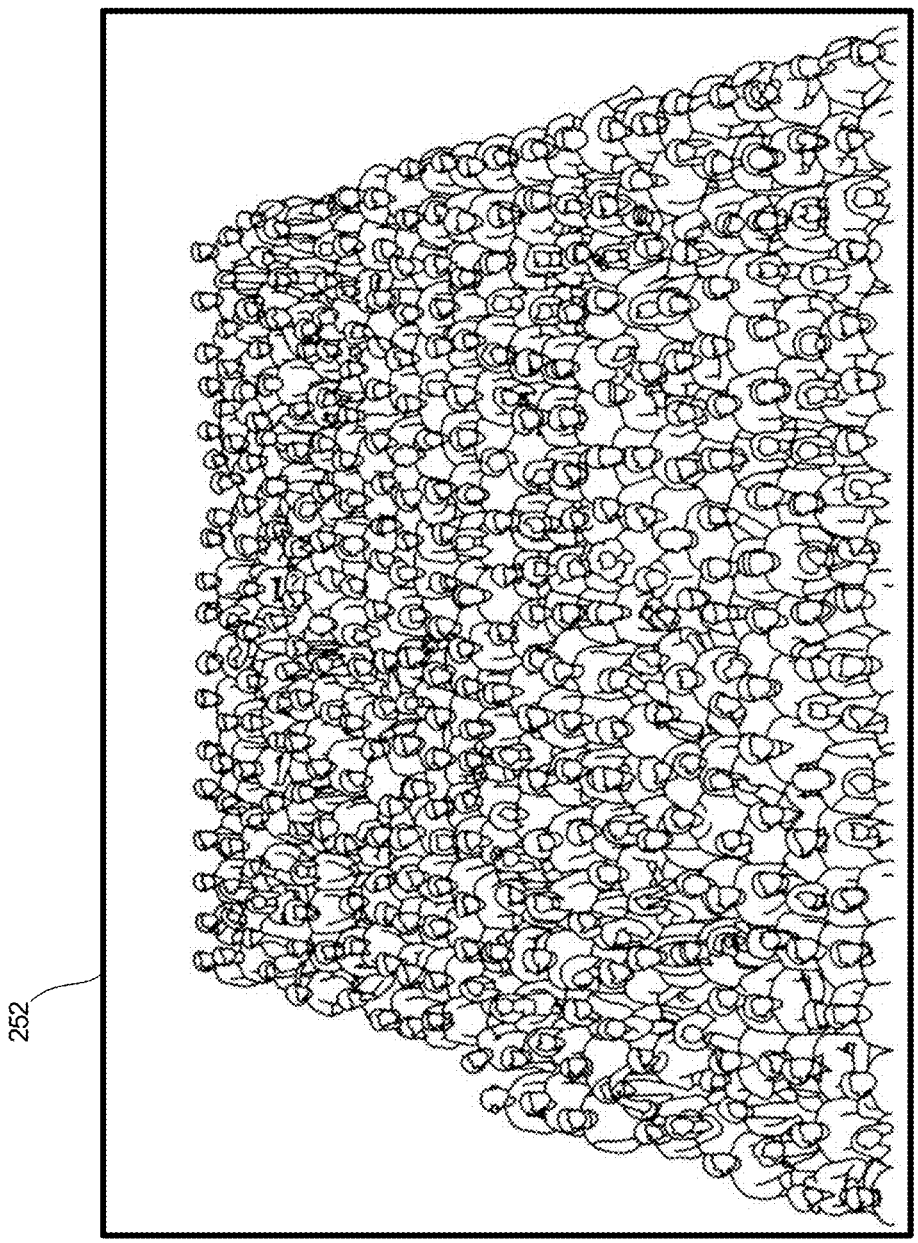

TRANSITIONING OF MEETING ENGAGEMENT BY TRANSITIONING VIEWING PERSPECTIVES TO A TEMPORARY VIEWING PERSPECTIVE SHOWING CLUSTERS OF GROUP ACTIVITY

BACKGROUND

The use of meta-verse environments for on-line meeting applications is becoming ubiquitous. Participants of online meetings now meet in three-dimensional virtual environments and share content within those virtual environments. Despite a number of benefits over other forms of collaboration, the use of 3D environments for sharing content can raise a number of drawbacks.

When meeting in 3D immersive virtual environments, depending on positions of users and a virtual camera position, it may be hard to see the activity of specific groups of people. For instance, if a virtual environment has a large number of meeting attendees, not all members of particular group of people can be positioned near one another. This may occur when people are on several teams and each team may react differently to different events. For example, if a person is on a developer team, and that person has an avatar positioned with avatars of other team members, they can react together to certain events, e.g., when their team gets an award. However, if that person is also involved in a special project, e.g., on a volunteer group that involves a different group of people, that person cannot get the same group experience if that volunteer group experiences a similar event, e.g., receives an award. Since that person has an avatar that is positioned with the developer team, that person cannot react, e.g., cheer, and experience the same synergistic group experience he or she is experiencing with the developer team.

By not being close to team members in a virtual environment, users may not share the same experience, or benefit from a team-building experience. The users may miss salient information and gestures, which can lead to a loss of communication of information and enthusiasm. These shortcomings can lead to ineffective interactions between a computing device and a user. In addition, the above-described shortcomings of existing systems can lead to a loss in user engagement. Being part of a group in a large virtual environment is important for each member of a team to see the energy of the team and for motivation and engagement in a meeting and overall productivity. Improved user engagement can also help improve the efficiency of computing systems as well. In addition, proper control of permissions managing the views of a virtual environment is also important for securing proprietary or confidential information. This is especially important for events where competing teams are participants in a virtual meeting and different views are generated for each person.

Computing devices that do not promote user engagement, or worse, contribute to a loss of user engagement, can lead to production loss and inefficiencies with respect to a number computing resources. For instance, when a user becomes fatigued or disengaged, that user may need to refer to other resources, such as documents or participate in other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience more like an in-person meeting and more engaging. In addition, when information in meta-verse environments is not displayed correctly, some content that is supposed to be hidden from some users can be inadvertently exposed when such content is displayed on virtual objects, such as a virtual screen.

SUMMARY

The techniques disclosed herein provide promotion of meeting engagement by transitioning viewing perspectives to a temporary viewing perspective showing clusters of group activity. A system can show each person a view of a large virtual environment, e.g., in a stadium full of representations of meeting attendees. Each person sees the virtual environment from a point of view originating from each person's representation, e.g., a first-person avatar view. When a group activity meets one or more conditions, the system determines parameters of a temporary perspective view from a point-of-view of a virtual camera based on the positions of people in a cluster of representations, e.g., avatars. The parameters of the temporary perspective view can be selected to show a threshold number of representations found in a cluster in a virtual environment. The system can then transition the view of each member of the group from a first-person perspective to the point-of-view of the virtual camera. In some embodiments, the transition from the first-person perspective to the virtual camera perspective can be done using an animation in the form of a fly-over to show other group members that are not in the cluster. This allows the system to show the synergistic activity of all people who are members of a group.

The system provides views of group activity. This has more technical benefits than other technologies that just stitch 2D images, as these disclosed features puts the avatars together to make them look like they are positioned together in a group. This shows all individuals of a group the synergy of a current reaction to an event.

The adaptive adjustments using temporary views can provide a number of technical benefits for computing systems. For instance, by providing adaptive adjustments of perspective views, each user of a communication session can gain the benefit of group activity even though they are not sitting together in an original virtual environment. By providing this stimulus, a system can promote user engagement, which can help a system to reduce user fatigue. By reducing user fatigue, particularly in a communication system, users can more effectively exchange information. This helps mitigate occurrences where shared content is missed or overlooked. This can reduce occurrences where users need to re-send information. More effective communication of shared content can also help avoid the need for external systems, such as mobile phones for texting and other messaging platforms. The system and features described herein can also help reduce the duplicative use of network, processor, memory, or other computing resources.

There is a benefit in showing the people in a group in their original virtual environment without modification to the virtual environment. The viewing user gets to see a focused view of the group activity, while also seeing the aspects of the original environment and other users, e.g., they can appreciate the energy of the whole meeting, e.g., wholistic group activity while showing focused small group activity.

The features disclosed herein also provide a number of improvements for the security of a system. For example, members of other teams are rejected from seeing synergistic activity of other groups. This allows each group to share information and to communicate with one another without sharing that information with members of other groups. For instance, in the sporting event example described above, the first group of fans may react together and share information such as future strategies without allowing the other fans to see that information.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5C shows a second interim perspective view that is used to show entities that are not in the temporary perspective view from a fly-over path.

FIG. 5D shows a third interim perspective view that is used to show entities that are not in the temporary perspective view from a fly-over path.

FIG. 5E shows a temporary perspective view that is used to show showing activity of a cluster of entities associated with a particular event.

FIG. 7D shows a first interim perspective view that is used to show entities that are not in the temporary perspective view from a fly-over path.

DETAILED DESCRIPTION

Figure 1:
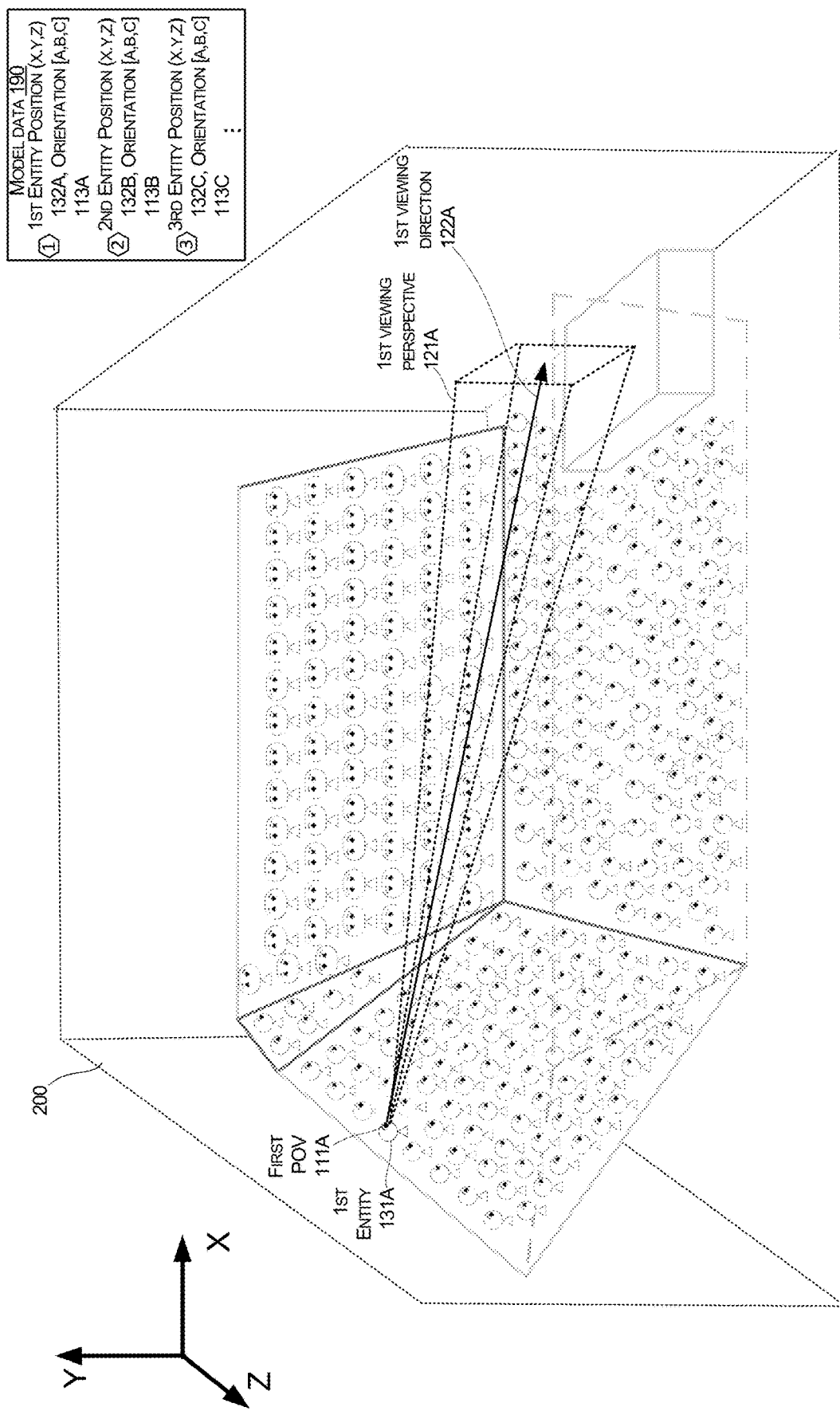
FIG. 1 shows a virtual environment that includes representations of attendees of a meeting.

FIGS. 1-6 illustrate aspects of a process for promoting engagement by transitioning to a temporary viewing perspective from a first viewing perspective associated with a first entity that is one of a plurality of entities positioned within a virtual environment. FIG. 1 shows aspects of virtual environment 200 that includes a number of entities 131A-131ZZ. In this example, the entities are in the form of avatars, which are also referred to herein as representations of users. For example, the first entity first entity 131A is in the form of an avatar that represents a first participant of a communication session. As shown, each entity has a location in the 3D environment 200, which may be based on coordinates, and each entity has an orientation, which is represented as a vector originating from a point on the entity, such as a point of view that is at the location of an avatar's eyes. The point of view may also be associated with a location in the 3D environment. In some configurations, an orientation vector 122 can indicate which direction an entity is facing. In this example, the first orientation vector 122A shows the direction that the first entity 131A is facing, and the first orientation vector 122A is based on a first point of view 111A of the first entity. The orientation vector for an entity can also be referred to as an "original orientation" of the entity that is based on the original model data 190.

Also shown, model data 190, also referred to herein as the original model data 190 or a data structure 190, can define positions and orientations for a plurality of entities 131. An entity can be a virtual object such as an avatar representing a user or an entity can be another type of virtual object, such as a virtual television screen, virtual furniture, a virtual camera, etc. A virtual camera is similar to an avatar in that it may have a position, orientation and a viewing perspective but it may not have a displayable entity, e.g., it may be an invisible virtual camera. The model data 190 can also define viewing perspectives 121 that originate from a point of view 111 for an individual entity. The viewing perspectives 121 extend in a direction with the orientation vector and each viewing perspective 121 can have dimensions, such as a width or height, that increase in size as a distance from the point of view increases. The model data can also define physical characteristics of each entity, such as size, shape, surface patterns, etc.

In one example, an entity can be an avatar or representation of a user. The point of view 111 can be at a specific location relative to an entity, such as a point of where the eyes of an avatar are located. The viewing perspective 121 of an entity can project from the point of view 111, and the viewing perspective 121 can be used to generate a rendering that is displayed to the user controlling the avatar. The system can display entities of a 3D environment 200 based on the location and orientation the avatar as well as the position of entities that are positioned within the viewing perspective 121. In the example of FIG. 1, the first entity 131A has a first viewing perspective 121A that follows the direction of the orientation vector 122A.

Figure 2:
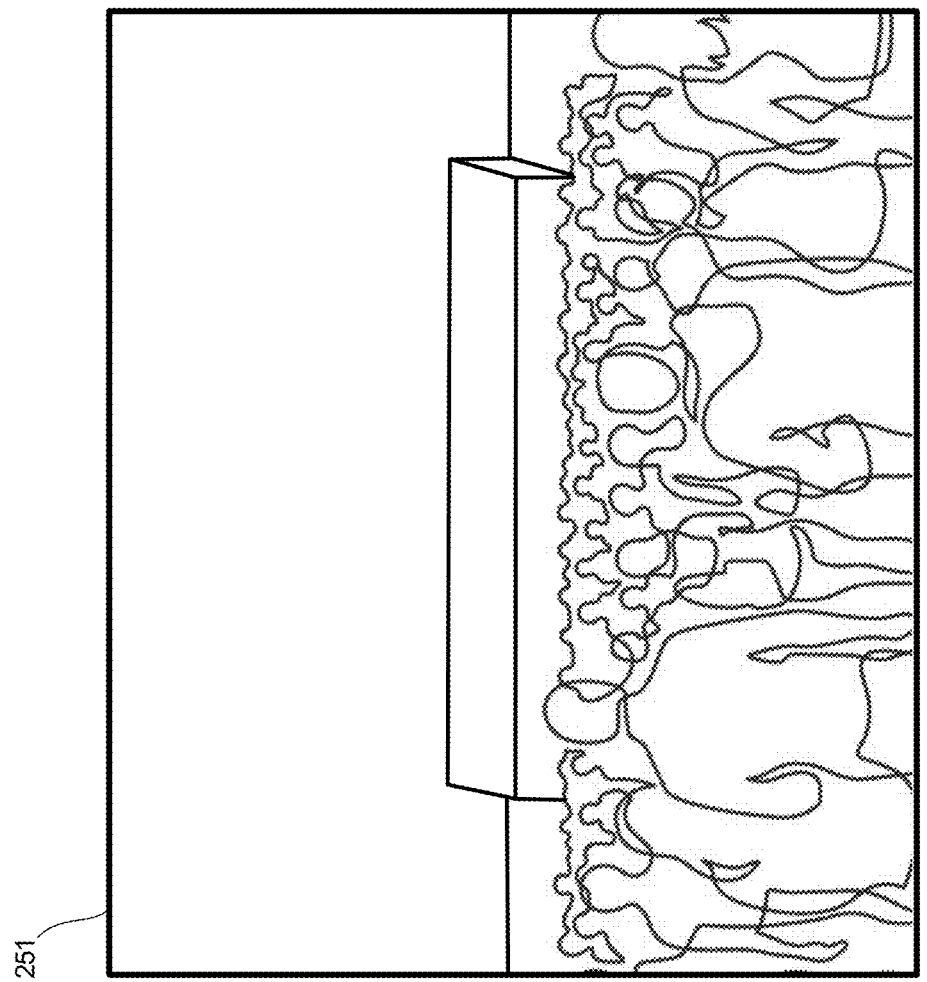
FIG. 2 shows an example of a rendering of a perspective view from a point of view that originates from a representation of one attendee.

As shown in FIG. 2, a rendering 251 of the first viewing perspective 121A can include any entity that is within the viewing perspective 121A, each avatar within the boundaries of the first viewing perspective 121A, and a portion of the stage of the virtual environment. A rendering 251 of a viewing perspective 121A can be a 2D image that is generated using any suitable projection technique that captures images from the first point of view 111A. A rendering generated from a viewing perspective may crop a portion of an entity that is not within the boundaries of the viewing perspective, as shown in FIG. 2. In this example, the system displays the first viewing perspective 121A to the first user by generating a rendering of the 3D environment 200 using the first viewing perspective 121A associated with the first entity 131A for display on a display device 11A associated with the first user 10A. This view is generated by use of the model data 190.

Figure 3:
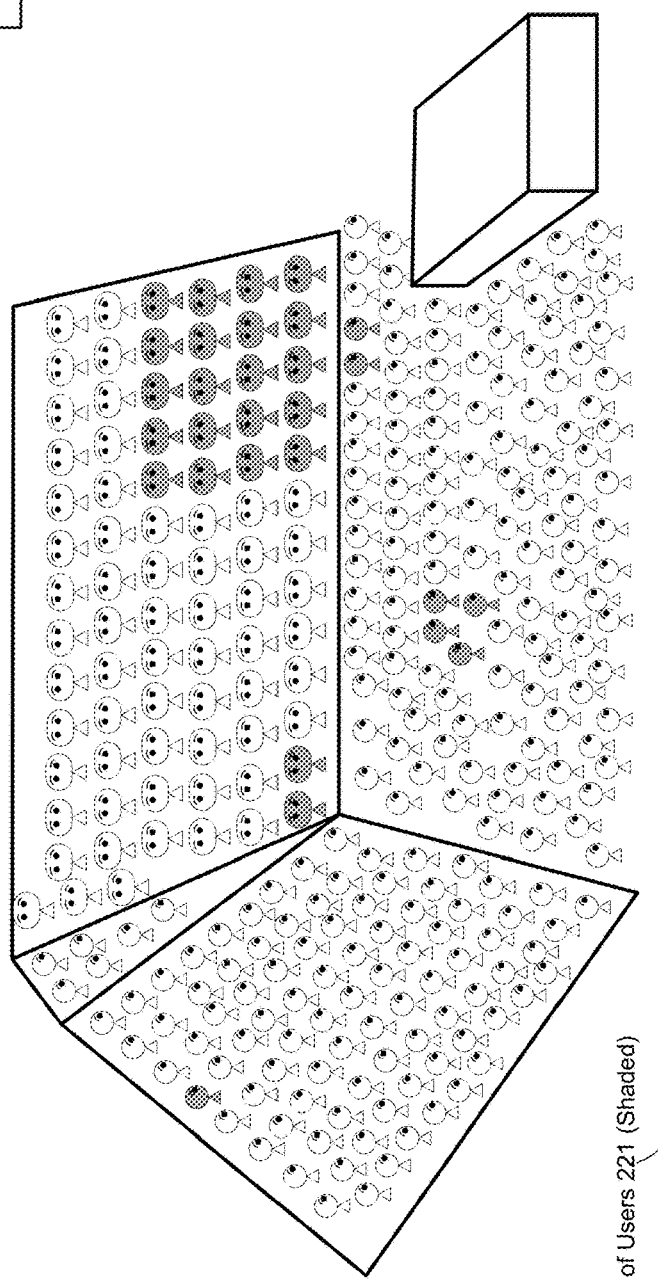
FIG. 3 shows a highlight of meeting attendees that are associated with a particular event.

As shown in FIGS. 3-6, one or more detected events causes the system to transition to a rendering 252 of a temporary viewing perspective 321 from a first viewing perspective 121A associated with a first entity 131A that is one of a plurality of entities 131A-131ZZ positioned within a 3D environment 200. FIG. 3 shows aspects of a system 100 having computers 11 each associated with people 10 who are participants of a communication session, such as a meeting in a virtual environment 200, which allows each person to communicate audio signals and allows each person to view each other through their own viewing perspectives originating from their avatars. FIG. 3 shows an example of a group of entities that are related to a particular event. These entities that are related to an event meeting a preset condition are shaded to illustrate aspects of this example.

While in a first state of operation, the system causes the display of the rendering 251 of a first viewing perspective 121A to the first computer 11A, the system can also do the same for each person having a representation in the virtual environment 200. While in this state, the system may receive signals from users indicating an event. The signals may be a computer-based input, such as an input causing the display of a reaction, e.g., the posting of a reaction emoji, or the signals may be an audio signal or a text signal indicating a specific event. For example, a presenter may indicate in an announcement that Team X won an award. When the system detects such an event that is related to a particular set of users, e.g., Team X, the system can retrieve organizational data or other metadata to determine identifiers of each user that's part of Team X. The system can then analyze the model data 190 to determine the position of each entity related to the identifiers.

Figure 4:
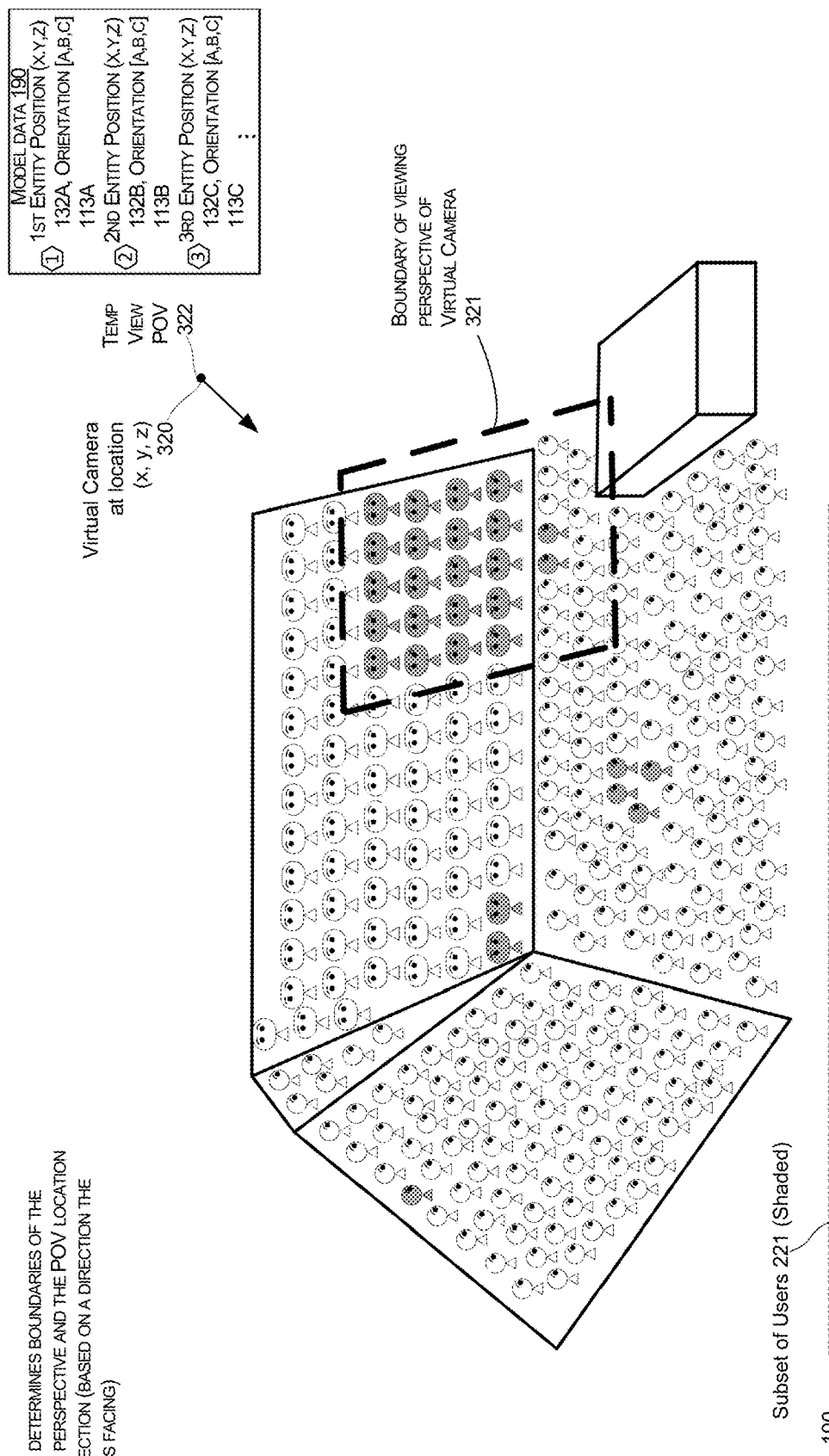
FIG. 4 shows an example of a temporary perspective view for showing activity of a cluster of entities associated with a particular event.

As shown in FIG. 4, in response to determining that the input identifying the event meets the preset condition, the system can then use those identifiers to generate parameters of the temporary viewing perspective 321, wherein the parameters of the temporary viewing perspective 321 include a threshold number of entities associated with the users 10A-10Z associated with the threshold level of activity. The system selects parameters such that the individual entities 131A-131Z are positioned within the temporary viewing perspective 321 of a virtual camera 320.

Clusters of entities that do not have a threshold number of entities related to an event that meets a preset condition are not selected for the temporary perspective view. For example, if a group of people are part of a team and that team has 26 people, the system will not generate parameters for a temporary perspective until it can find a cluster of those team members that exceeds a particular threshold. For instance, if a system has a threshold number of users at ten, and the boundaries of a perspective view cannot be generated to show a cluster of entities of at least 10 entities that are adjacent to one another, the system will not generate the parameters of the temporary perspective view. However, in this example, there are more than 10 entities of group members that are adjacent to one another, thus, the system generates parameters for the temporary viewing perspective 321.

The size and shape of the temporary viewing perspective can be based on the number of entities in a group. For example, parameters of the temporary viewing perspective 321 can include coordinates in the virtual environment. The coordinate can be configured such that the border of the temporary viewing perspective 321 is around a cluster of selected entities meeting the criteria defined herein. The distance between the border of the temporary viewing perspective 321 and the virtual camera 320 can be based on the density of the entities, the number of entities, and the shape of the cluster of select entities. The position of the virtual camera can include coordinates that position the virtual camera such that a particular surface of the entities, e.g., the face of the avatars, is displayed in a rendering generated from the temporary viewing perspective 321. The temporary viewing perspective 321 and the position 322 of the virtual camera 320 can be used to generate a temporary rendering to show group activity.

Figure 6:
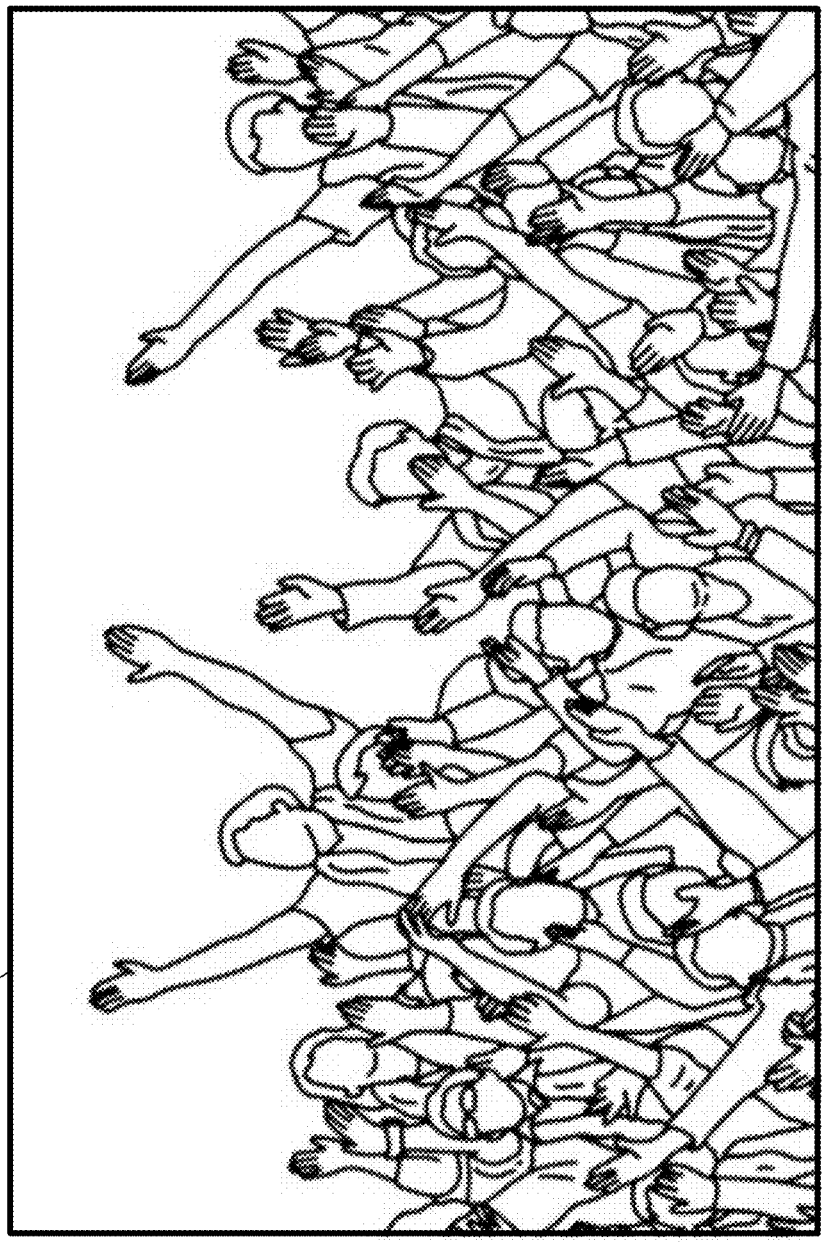
FIG. 6 shows an example of a rendering of a perspective view from a point of view that originates from a virtual camera using the parameters that are selected for the temporary perspective view for showing activity of a cluster of entities associated with a particular event.

In response to determining that the input identifying the event meets the preset condition, the system can cause the display of the temporary rendering that is based on the temporary viewing perspective 321. In this state of the system, as shown in FIG. 6, the system can generate a rendering 251 of the individual entities 131A-131Z positioned within the temporary viewing perspective 321 of the virtual camera 320 for display on a screen of a computer 11A associated with the first user 10A. The rendering of the individual entities are displayed using the temporary viewing perspective 321 and the position 322 of the virtual camera 320. The rendering using the temporary viewing perspective 321 and the position 322 of the virtual camera 320 can include some aspects of the environment 200 comprising a threshold number of the individual entities 131A-131Z each representing the users 10A-10Z associated with the event.

The system can cause a transition number a number of scenarios. For example, in a first scenario, the system can detect an audio signal from 35% of the users involved in Project X. In response to activity meeting such criteria, e.g., a threshold number of people of a predetermined group of people having avatars in a virtual meeting that provide a predetermined input or provide an audio signal indicating an event, the system can cause the transition to a rendering 251 of the 3D environment 200 using the first viewing perspective 121A originating from a point of view 111A positioned in association with the first entity 131A to a rendering 252 of the temporary viewing perspective 321 that originates from the second point of view 322 and uses parameters in response to activity signals indicating the threshold level of activity.

In another example, a second scenario, the system can identify a group of people first, e.g., identify a group of entities performing gestures, making noise, providing input gestures to a computer, reacting to an announcement, etc. By this visual activity, e.g., the activity signals being a video stream or a 3D model data showing movement of entities, the system can identify by the activity that the group is meeting a preset condition, e.g., 30% of this team is making noise or moving. In response to this identification of this preset condition, e.g., if the threshold is 25%, the system can then identify the location of the biggest cluster or clusters meeting a minimum number of entities. Once the location and boundaries of the biggest cluster or clusters meeting a minimum number of entities is determined, the system can then generate parameters of the view of those clusters meeting those conditions.

Thus, in response to determining the activity signals indicating the threshold level of activity of the subset 221 of users 10A-10Z that are members of the predetermined group, the system can determining parameters of the temporary viewing perspective 321, wherein the parameters of the temporary viewing perspective 321 include a threshold number of entities associated with the users 10A-10Z associated with the threshold level of activity, wherein the individual entities 131A-131Z are positioned within the temporary viewing perspective 321 of a virtual camera 320. As illustrated in FIG. 4, the system can determine parameters for the group view of team members, e.g., having a "threshold level of affiliation" in the temporary perspective. The system can then also determine coordinates for a second point of view 322 for the virtual camera 320, wherein the temporary viewing perspective 321 originates from the second point of view 322. The system can then transition the rendering 251 of the 3D environment 200 using the first viewing perspective 121A originating from a point of view 111A positioned in association with the first entity 131A to a rendering 252 of the temporary viewing perspective 321 that originates from the second point of view 322 and uses parameters in response to activity signals indicating the threshold level of activity.

Users can be associated with the event and the event can meet a preset condition using one or more factors. For example, a system can receive signals from individual computers 11, each person can be making a sound, e.g., cheering, or providing a signal, such as a cheering emoji. users of an event. The system can determine that an event meets a preset condition when each user providing the signal has a threshold level of affiliation, e.g., an org chart shows that they are members of a corporate team, and when each users having the threshold level of affiliation have a threshold level of activity. A threshold level of activity can be, for example, a predetermined percentage of a group, e.g., when more than 80% of a team is cheering or providing another type of active input causing a reaction, communicating an emotion, providing a voice input, etc. Thus, when less than a threshold level of activity is present, e.g., using an example threshold of 80%, when less than 80% of a team is cheering, the system the event does not meet the preset condition and the system does not generate parameters of the temporary viewing perspective 321.

This allows the system to generate parameters of the temporary viewing perspective 321 each group that meets a threshold. This means that a person can be members of different teams or different projects and they can see groups of people that belong to each team or project reacting together. For instance, if a person is part of a developer team and a threshold number of those developers cheer, that person can see themselves in a cluster of avatars with team members. If that same person worked on a multiuser editing session of a spreadsheet, and people were recognized in an announcement regarding that spreadsheet, the system can generate parameters of the temporary viewing perspective 321 that shows all of the avatars of those contributors in a group reacting together.

Thus, in some embodiments, the input identifying the event meets the preset condition when activity signals are received from a subset of computing devices 11A-11Z associated with a subset 221 of users 10A-10Z have a threshold level of affiliation with one another, and where the activity signals indicate the threshold level of activity, wherein the generation of the parameters of the temporary viewing perspective 321 and the related rendering 252 of the individual entities 131A-131Z positioned within the temporary viewing perspective 321 of the virtual camera 320 is in response to receiving the activity signals indicating the threshold level of activity from the subset of computing devices 11A-11Z associated with the subset 221 of users 10A-10Z having the threshold level of affiliation with one another.

In some configurations, the event may meet a preset condition based on affiliations, without the use of activity signals. Thus, in some embodiments, the input identifying the event meets the preset condition when activity signals are received from a subset of computing devices 11A-11Z associated with a subset 221 of users 10A-10Z have a threshold level of affiliation with one another, wherein the generation of the parameters of the temporary viewing perspective 321 and the related rendering 252 of the individual entities is in response to receiving the activity signals from the subset of computing devices 11A-11Z associated with the subset 221 of users 10A-10Z having the threshold level of affiliation with one another.

In some configurations, the event may meet a preset condition based on activity levels, without the levels of affiliation. Thus, in some embodiments, the input identifying the event meets the preset condition when activity signals are received from a subset of computing devices 11A-11Z associated with a subset 221 of users 10A-10Z and the activity signals indicate a threshold level of activity, e.g., they are providing a predetermined volume level or providing a predetermined input, e.g., a particular emoji posting. Thus, the generation of the parameters of the temporary viewing perspective 321 and the related rendering 252 of the individual entities is in response to receiving the activity signals from the subset of computing devices 11A-11Z associated with the subset 221 of users 10A-10Z, wherein the activity signals of the subset 221 of users 10A-10Z indicate the threshold level of activity.

In some embodiments, the rendering of the individual entities positioned within the temporary viewing perspective of a virtual camera are displayed on the display device until the activity signals of the subset 221 of users reduces below a second activity threshold level. Thus, in response to the activity signals of the subset 221 of users reducing below the second activity threshold level, the display on the display device 11A associated with the first user 10A returns to the rendering of the 3D environment 200 using the first viewing perspective 121A associated with the first entity 131A. This can apply to all users of a group.

The system can also modify permissions in response to the input identifying the event meets the preset condition. For example, the modified permission allow a first set of computing devices of the users 10A-10Z associated with the event to display the rendering of the individual entities using the supplemental model 191 defining the second 3D environment 201. The permissions are also modified in response to the event to restrict a second set of computers associated with other users from displaying the rendering 252 that is based on the parameters of the temporary viewing perspective 321.

In some embodiments, the system restricts the transition from the rendering 251 of the using the first viewing perspective 121A to the rendering 252 of the temporary viewing perspective until the subset 221 of users 10A-10Z has the threshold level of affiliation with one another. This saves the system resources from executing transitions until people having actual affiliations, e.g., they are on the same team in an organization chart, have a common working file each person made contributions to, or are part of a common project, are part of an event, such as an announcement about the subset of users or the subset of users providing a threshold level of activity, e.g., 80% of the subset of users provides an input showing an expression, e.g., an emoji or a message. Users that are not part of the group or the detected event are also restricted by the permissions from a display of the rendering 252 of the individual entities using the parameters of the temporary viewing perspective 321.

Figure 5A:
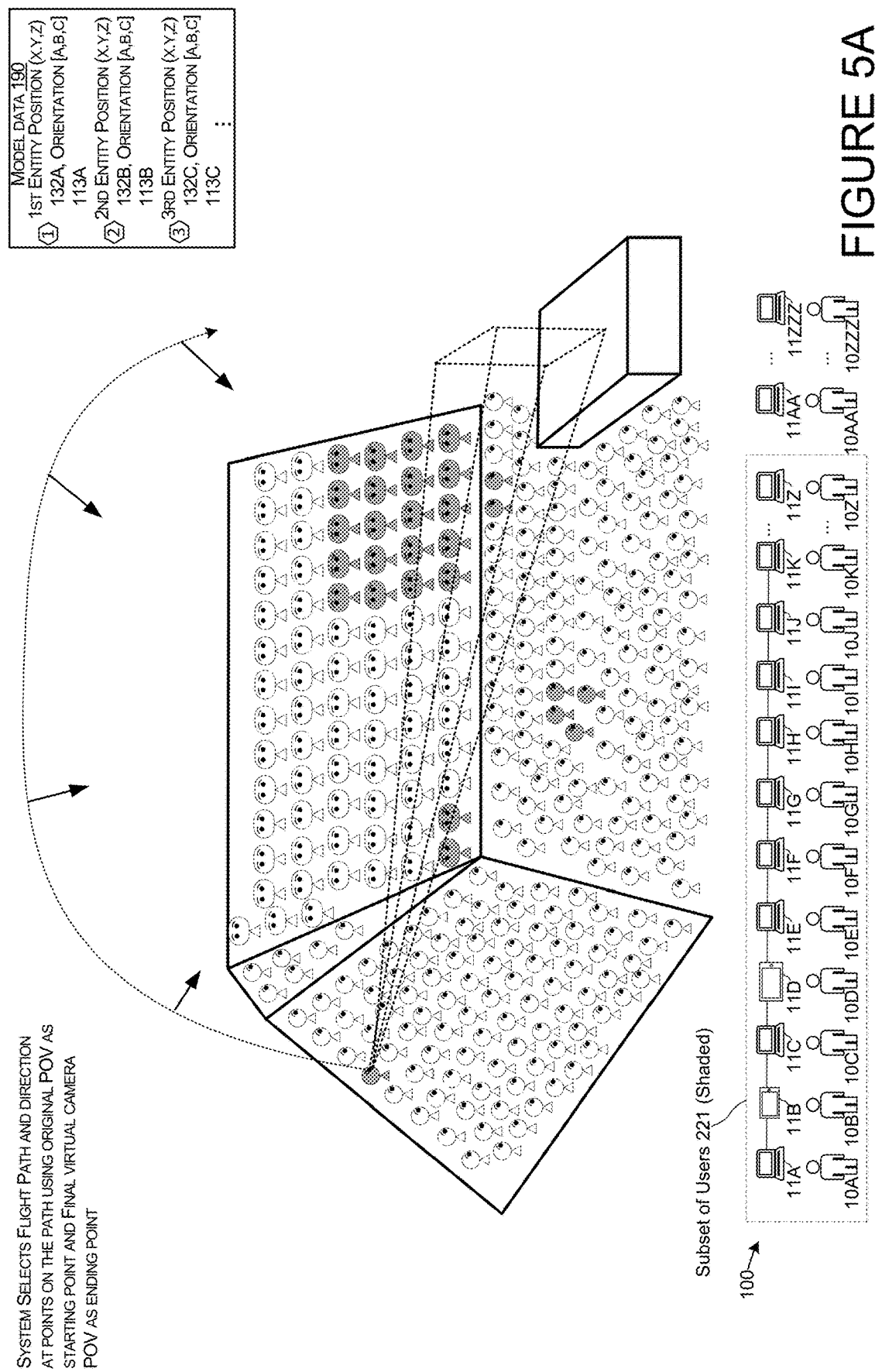
FIG. 5A shows an example of a path that can be generated to show entities associated with a particular event that are not shown in the temporary perspective view.
Figure 5B:
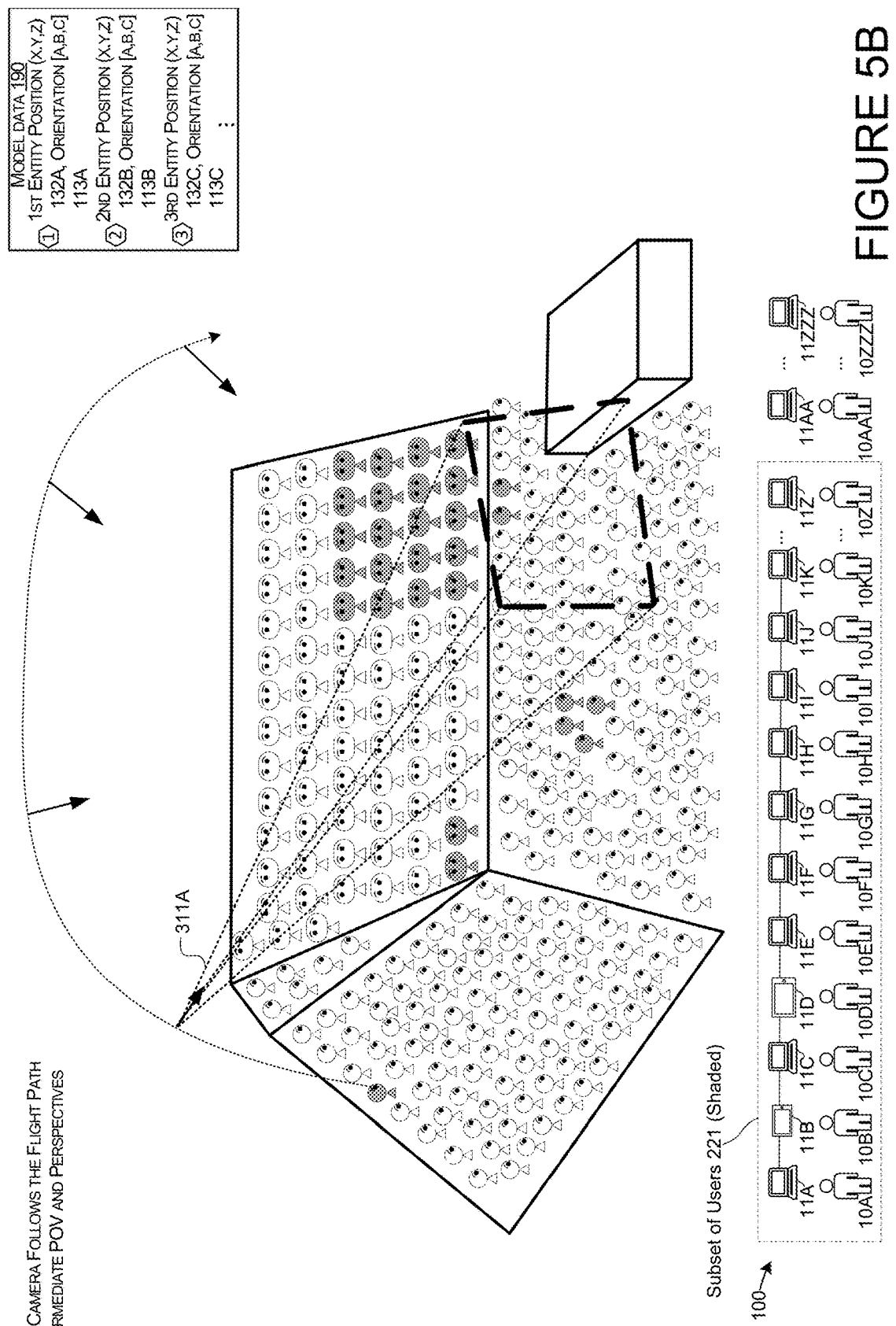
FIG. 5B shows a first interim perspective view that is used to show entities that are not in the temporary perspective view from a fly-over path.

FIGS. 5A-5E show how other group members, who are not positioned with the parameters of the temporary viewing perspective 321 and the related rendering 252 are displayed to the users of a group. This example uses the first perspective and the temporary perspective view and generates a flight path from each view to show interim views. For example, FIG. 5A shows the first view of a transition caused by a detected event. This starts with the view from the first view point 111A. The path is configured to show interim views of other group members before the temporary perspective view is shown. For example, as shown in FIG. 5B, the view is moving towards entities that are associated with group members. Then in FIG. 5C, the view is directed to entities on the main floor that are associated with group members. then in FIG. 5D, the view is directed to entities that are associated with group members that are in the stands but positioned away from the cluster of group members that is greater than a threshold number of people. Then in FIG. 5E, the view is using the parameters of the temporary viewing perspective 321 and the related rendering 252 of the individual entities.

In some embodiments, the system determines parameters for a path comprising a number of intermediate viewing perspectives 311. The path starts with a first point of view 111A of the first viewing perspective 121A and ends with the second point of view 322 of the temporary viewing perspective 321. The transition between the rendering 251 using the first viewing perspective 121A and the rendering 252 of the temporary viewing perspective 321 further comprises generating an animation showing renderings from the intermediate viewing perspectives 311 of the path between the display of the rendering 251 using the first viewing perspective 121A and the rendering 252 of the temporary viewing perspective 321. The the intermediate viewing perspectives and points of view that are associated with the intermediate viewing perspectives are positioned to capture images of select entities associated with the users 10A-10Z associated with the threshold level of activity. The images of the select entities includes entities that are not positioned within the temporary viewing perspective 321 of a virtual camera 320.

The example rendering of FIG. 6 shows an example of a rendering 252 that is based on the parameters of the temporary viewing perspective 321 and the related rendering 252 of the individual entities. This view may be displayed until the activity does not meet one or more criteria. For instance, once the activity that causes the user interface transition stops or does not meet the criteria defined herein, the system can return a view from the temporary viewing perspective 321 to the original viewing perspective 121A.

Figure 7A:
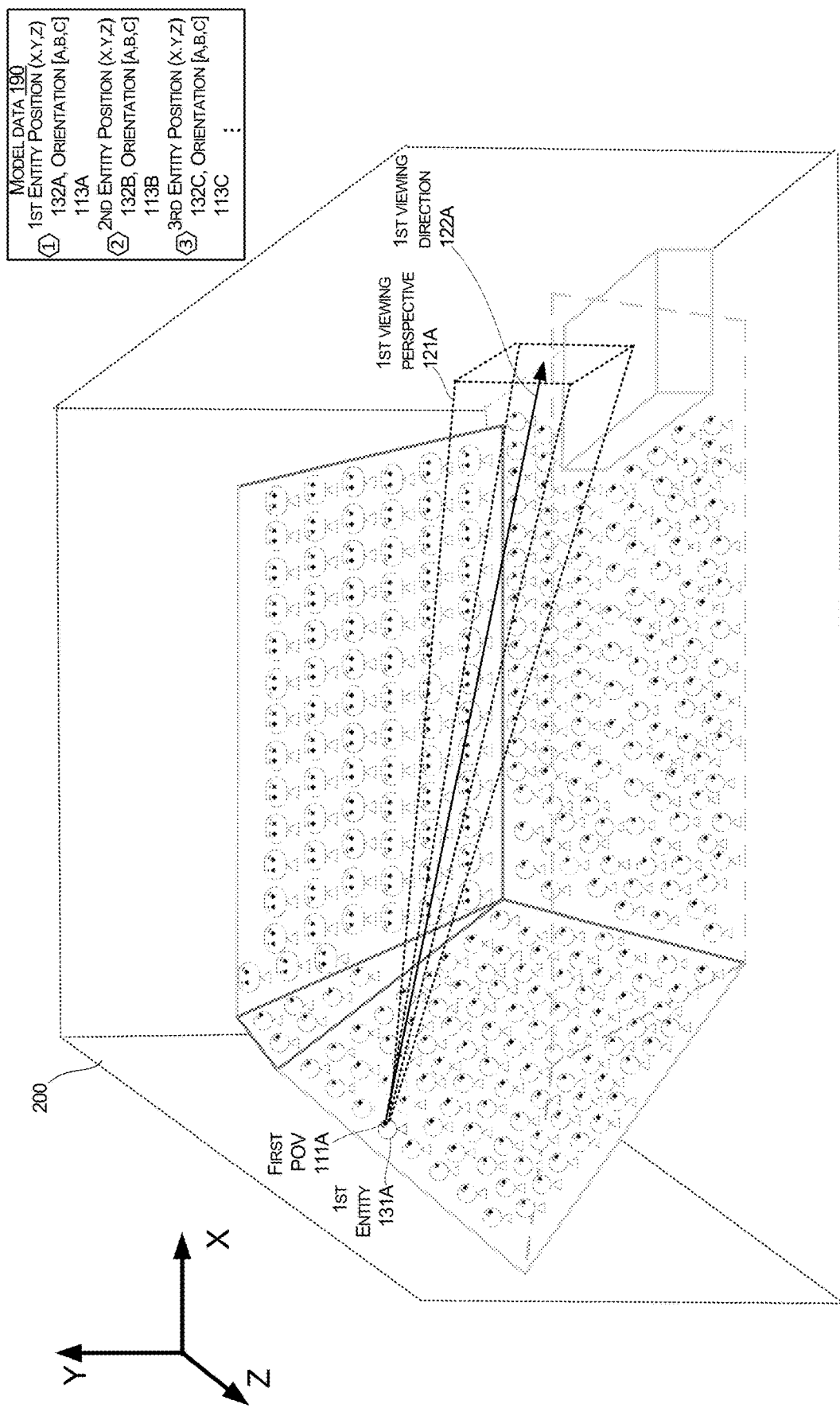
FIG. 7A shows a virtual environment that includes representations of attendees of a meeting.

FIGS. 7A through 7J shows another embodiment where a supplemental model having a select group of avatars is generated prior to a selection and use of a flight path for a virtual camera. FIG. 7A shows a first state of an original model, similar to the model shown in FIG. 1, where the first user 10A is in a position within a virtual environment. This viewing perspective shown in FIG. 7A allows the computer 11A of the first user to see the rendering shown in FIG. 2 using the viewing perspective 121A.

Figure 7B:
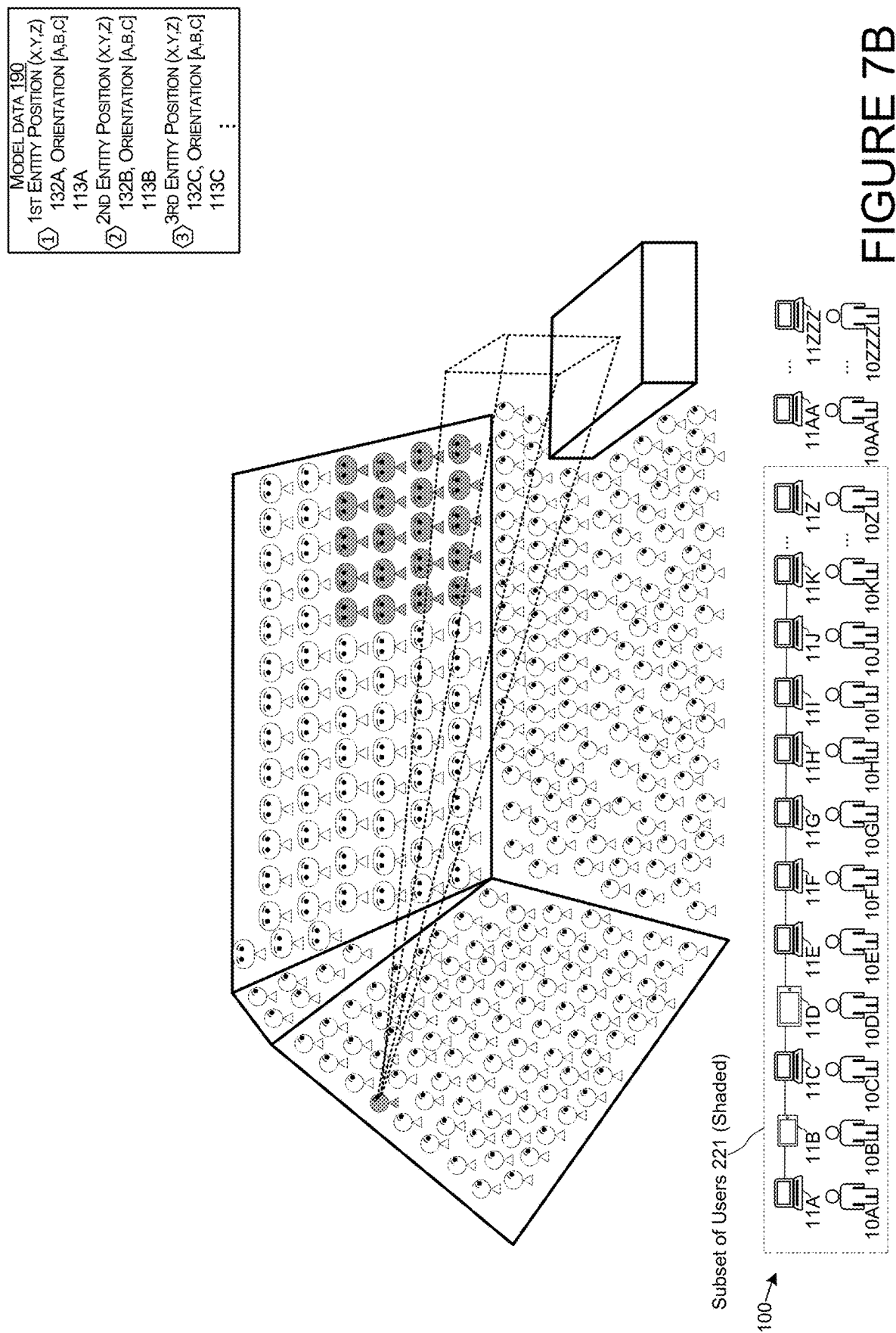
FIG. 7B shows a state of the virtual environment when some of the representations of attendees of a meeting are part of an event
Figure 7C:
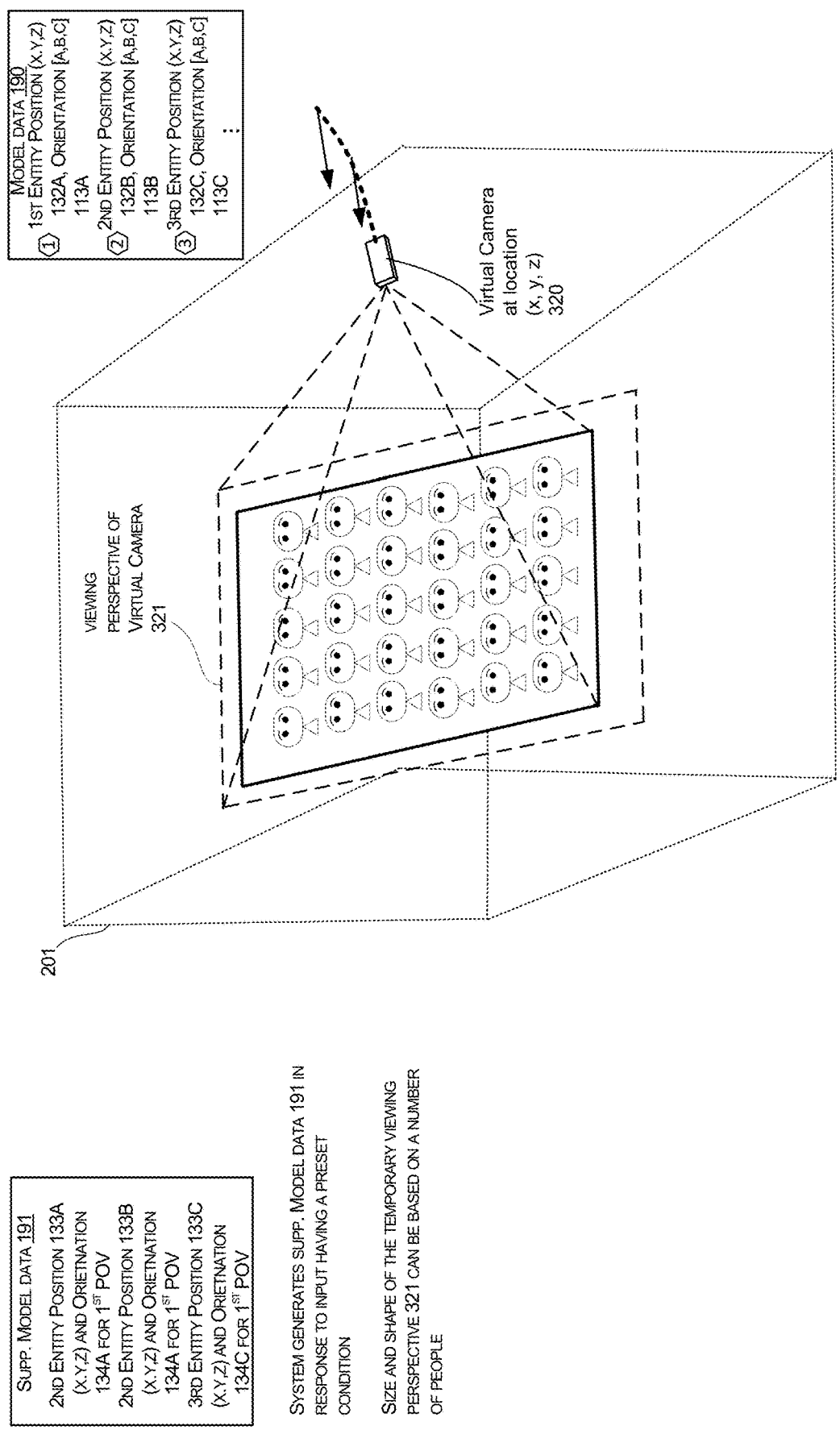
FIG. 7C shows an example of a path that can be generated to show entities associated with a particular event, the path being part of a new virtual environment that is defined by a supplemental model.

As shown in FIG. 7B, the system can detect one or more events that causes the system to transition to the rendering 251 to a new rendering 252 showing a number of perspective, as a fly over view to show group activity and environmental context. The system detects the one or more events by determining the activity signals indicating a threshold level of activity of a subset (221) of users (10A-10Z) that are members of the predetermined group, as described herein.

In response to determining the activity signals indicating the threshold level of activity of the subset (221) of users (10A-10Z) that are members of the predetermined group, as shown in FIG. 7B, the system can generate a supplemental model 191 defining a second 3D environment 201 comprising individual entities 131A-131Z (also referred herein as the subset of individual entities 131A-131Z) each representing the users 10A-10Z associated with the event, wherein the individual entities 131A-131Z are positioned within a temporary viewing perspective 321 of a virtual camera 320. In this example, a subset 221 of users 10A-10Z are related to the event from an input they provided or by having a threshold level of affiliation, e.g., they are members of a team or related in other ways, e.g., common editors of a document, part of a project, etc. The supplemental model can have position and orientations of each entity. The supplemental model can be generated by retrieving identifiers of each person in the subset of users and then retrieving avatar data or each person. The avatar data is used to build a temporary virtual environment defined by the supplemental model 191.

The system can also generate a temporary viewing perspective 321 of a virtual camera. The size and shape of the temporary viewing perspective can be based on the number of entities in a group. For example, parameters of the temporary viewing perspective 321 can include coordinates in the virtual environment. The coordinate can be configured such that the border of the temporary viewing perspective 321 is around a cluster of selected entities meeting the criteria defined herein. The distance between the border of the temporary viewing perspective 321 and the virtual camera 320 can be based on the density of the entities, the number of entities, and the shape of the cluster of select entities. The position of the virtual camera can include coordinates that position the virtual camera such that a particular surface of the entities, e.g., the face of the avatars, is displayed in a rendering generated from the temporary viewing perspective 321. The system can also determine a path (dashed line) in which the virtual camera travels to generate a fly over of the group. The path can also have a number of points where a direction of an interim perspective can be selected to show individual frames of an animated fly over.

Figure 7E:
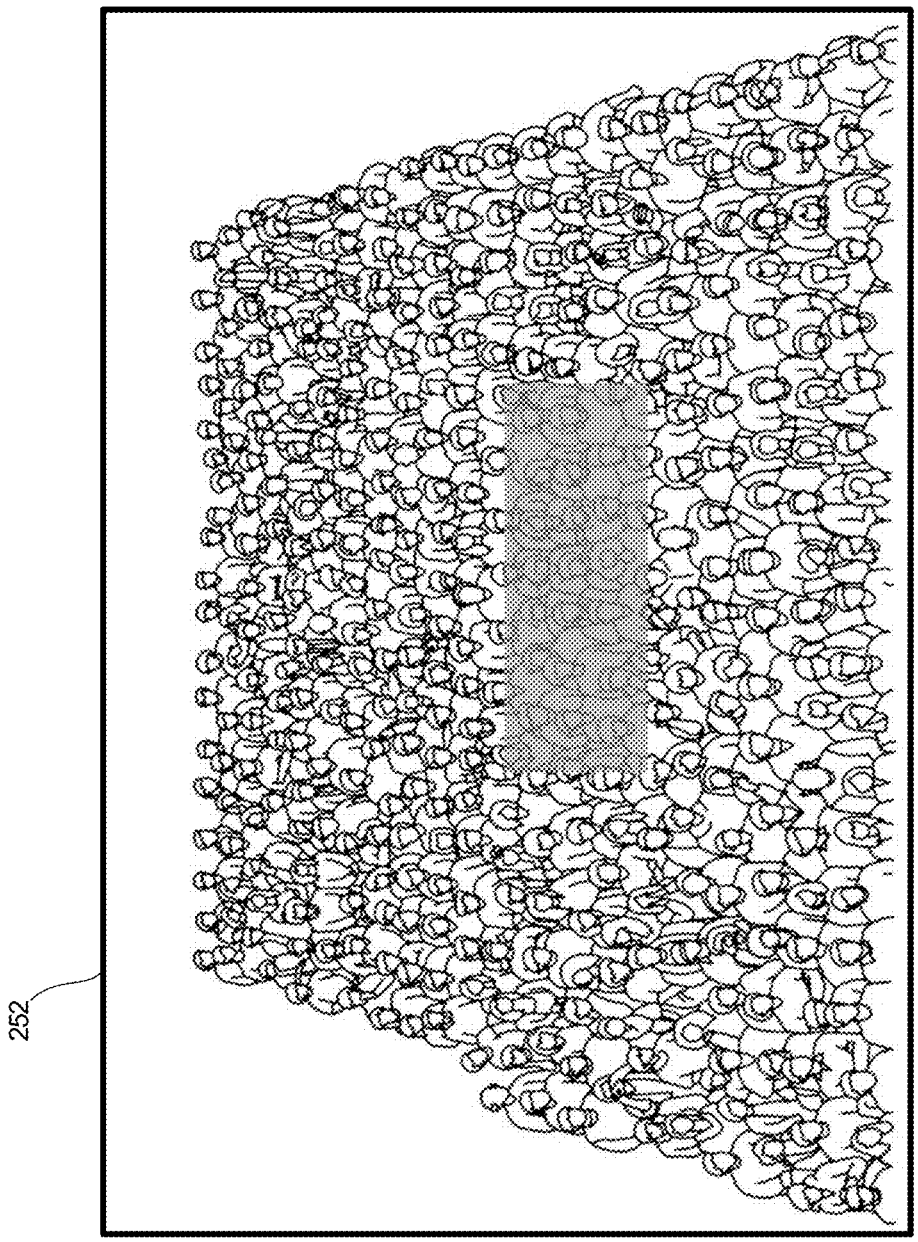
FIG. 7E shows a target area where the zoom is selected to show details of each user in the group.
Figure 7F:
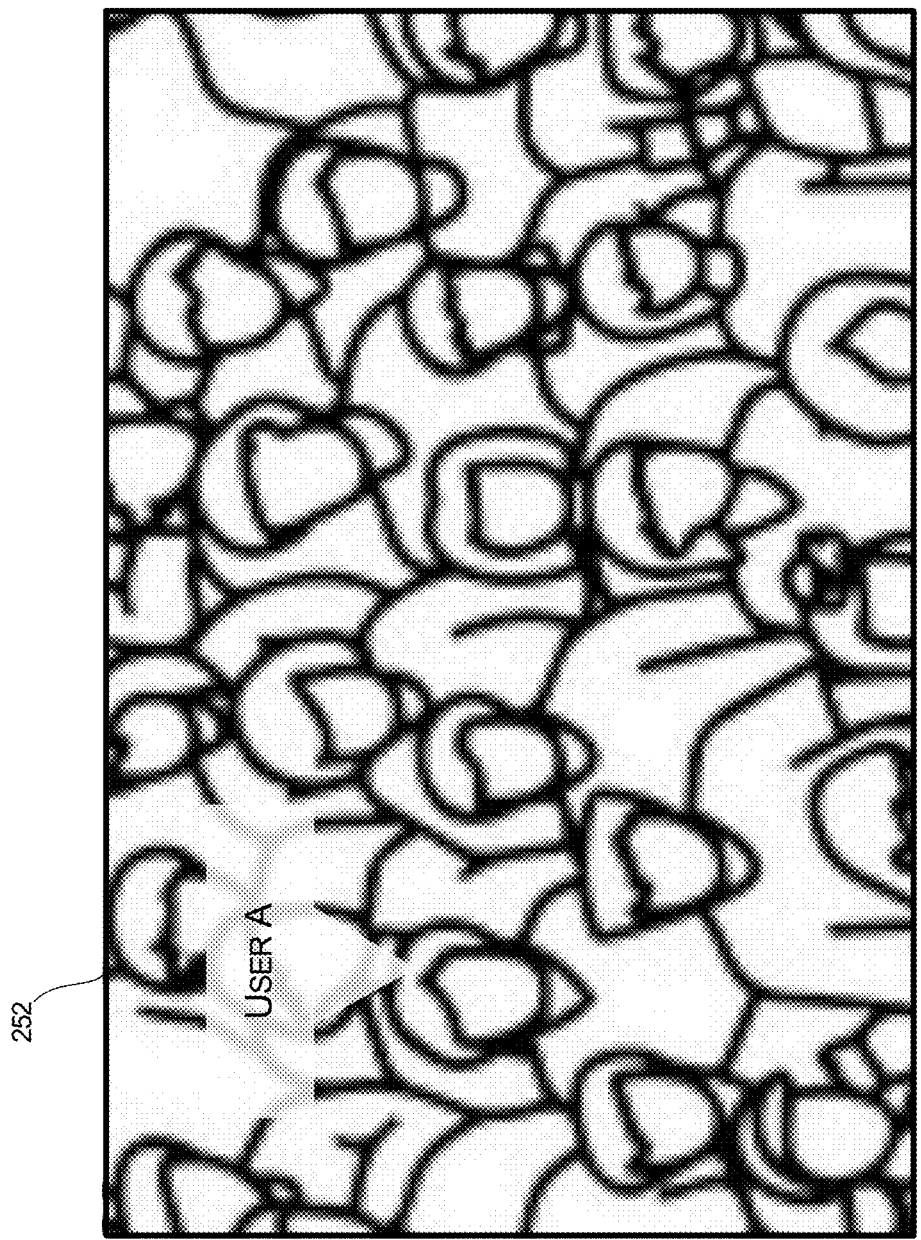
FIG. 7F shows a second interim perspective view that is used to show entities that are not in the temporary perspective view from a fly-over path.
Figure 7G:
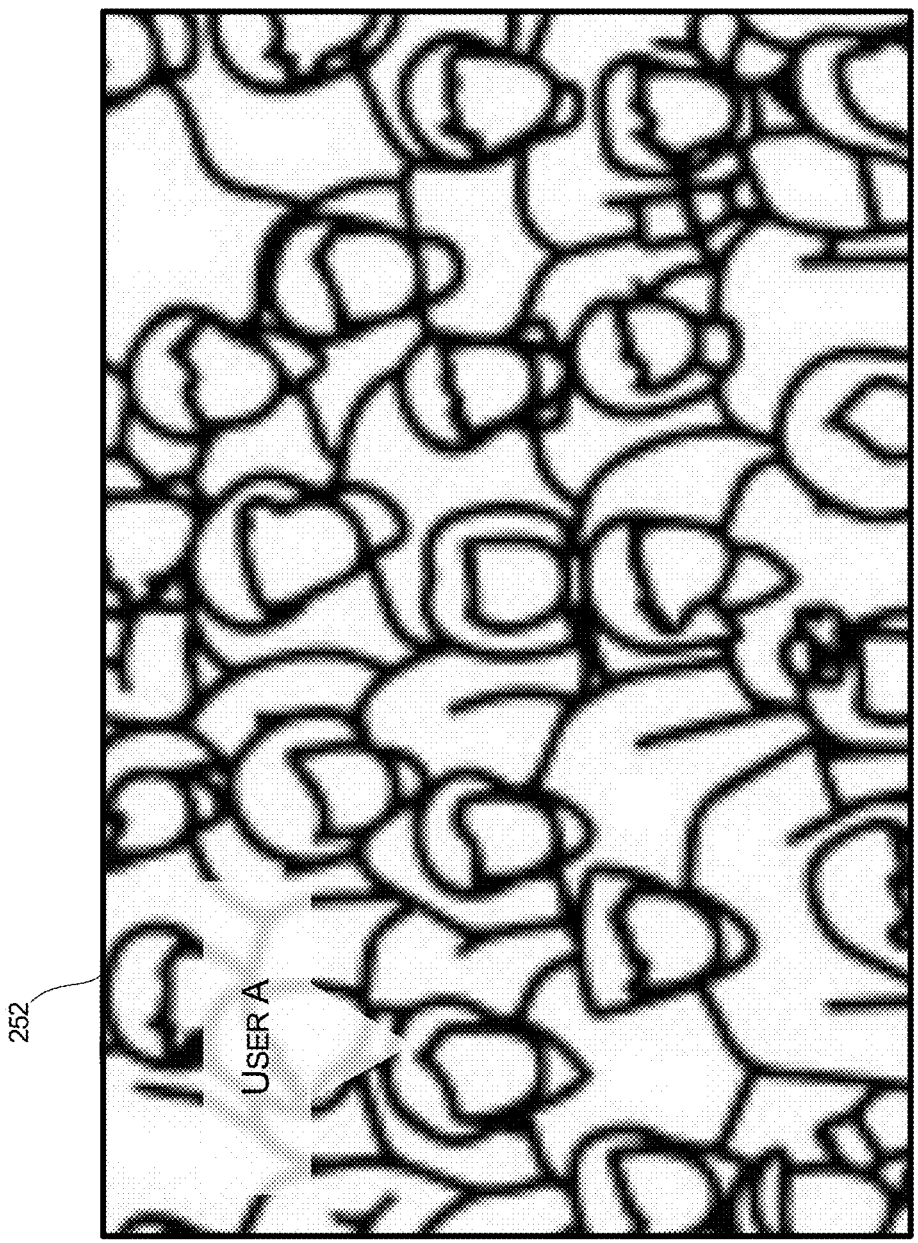
FIG. 7G shows a third interim perspective view that is used to show entities that are not in the temporary perspective view from a fly-over path.
Figure 7H:
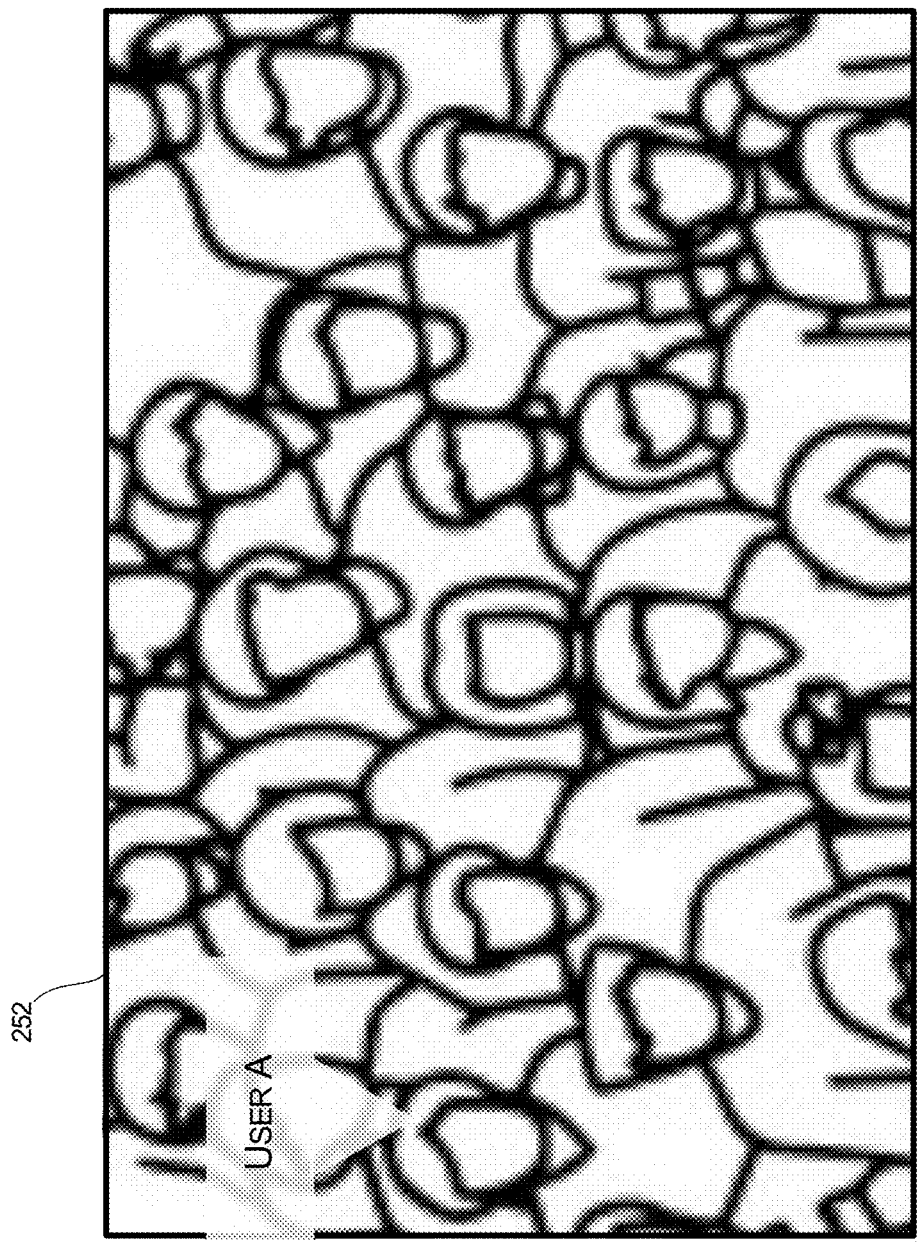
FIG. 7H shows a fourth interim perspective view that is used to show entities that are not in the temporary perspective view from a fly-over path.
Figure 7I:
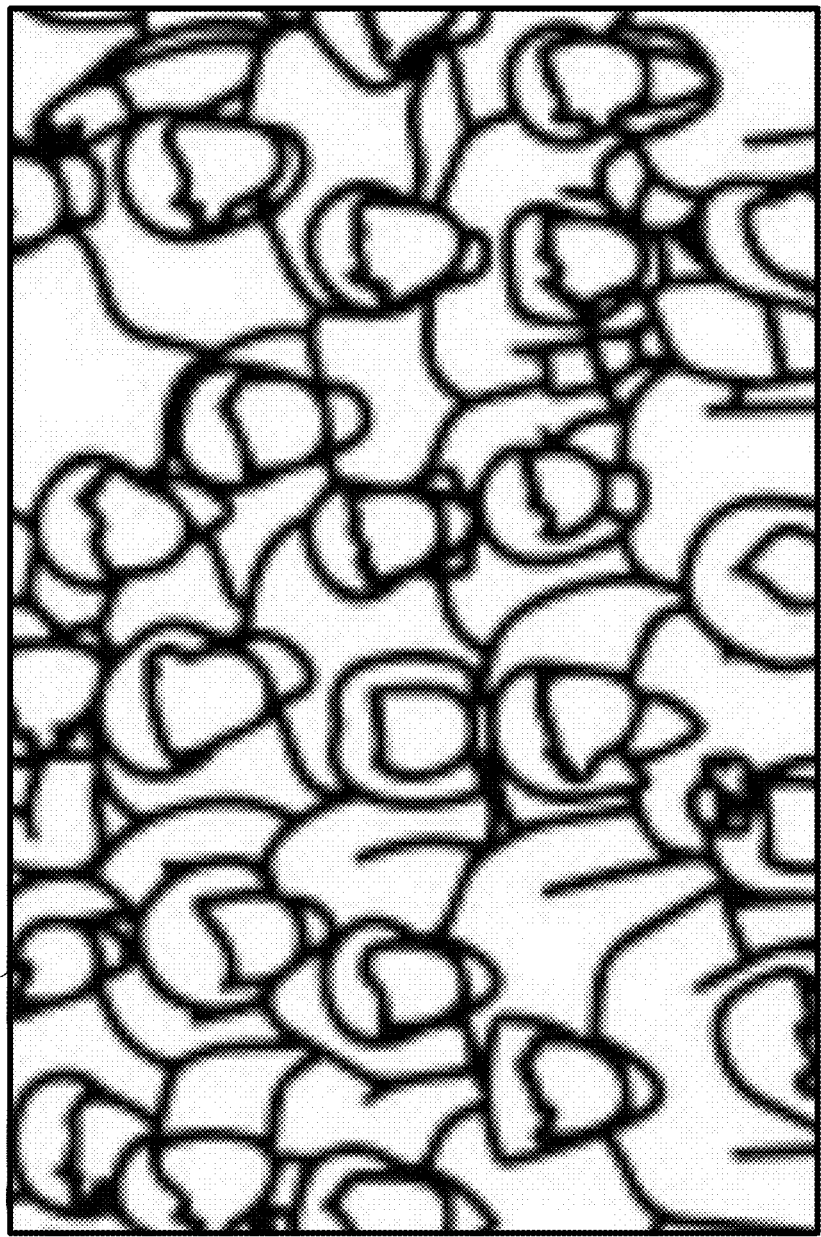
FIG. 7I shows a fifth interim perspective view that is used to show entities that are not in the temporary perspective view from a fly-over path.
Figure 7J:
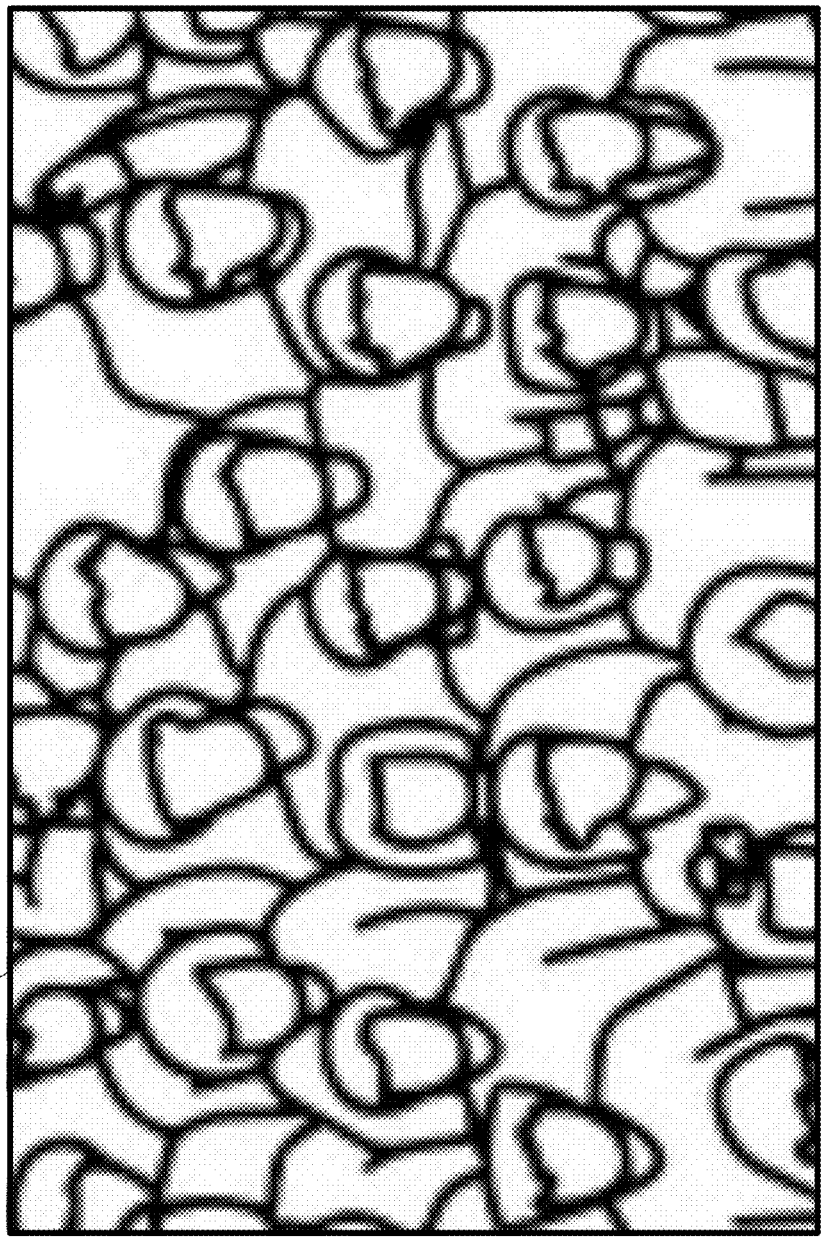
FIG. 7J shows a sixth interim perspective view that is used to show entities that are not in the temporary perspective view from a fly-over path.

FIG. 7D and FIG. 7F-7J show an example of a rendering 252 that can be generated for the fly over animation using the path and the interim perspectives. FIG. 7E shows a target area in a shadowed box where the zoom of the perspective is to land to show details of each user in the group. This wide view zooming into a narrow view enables the system to provide a broader context to the group activity by showing a wider perspective of the group and then showing interim views of more narrow perspective views that show more detail for each participant. This variation in the viewing perspective is important for allowing a user to understand the broader context as well as finer details of the interactions between the members of the subset of users, e.g., the subgroup. The benefit of this zoom level is that the group can be shown at a level where people can see the faces of teammates but also show the teammates in the original environment (model of FIG. 4) or a breakout environment (model of FIG. 7C). The view of FIG. 7F-7J can be based on a supplemental model of FIG. 7C or based on the original model with entities in the original virtual environment.

Figure 8:
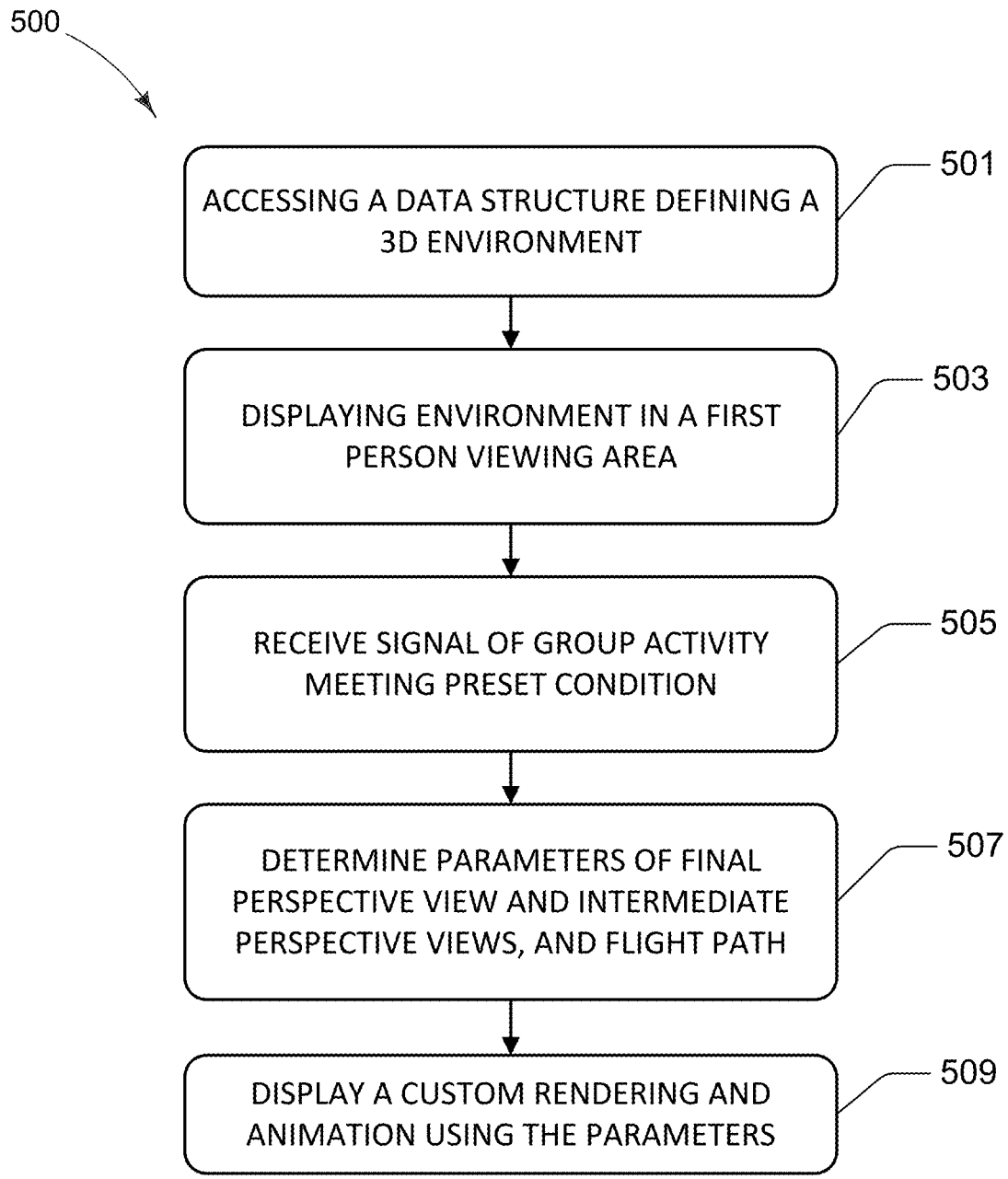
FIG. 8 shows a flow diagram showing aspects of the disclosed techniques.

FIG. 8 is a diagram illustrating aspects of a routine 500 for promoting engagement by transitioning to a temporary viewing perspective 321 from a first viewing perspective 121A associated with a first entity 131A that is one of a plurality of entities 131A-131ZZ positioned within a 3D environment 200. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 8 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 501 where the system 100 accesses a data structure 190 defining the 3D environment 200, the data structure 190 defines a position 132 and an orientation 113 for each entity of the plurality of entities 131 of the 3D environment 200, the data structure 190 defines at least one viewing perspective 121 that is based on one or more points of view 111 for individual entities 131 that are selectable for generating custom renderings 300 of the at least one viewing perspective 121 for a computing device 11A of a communication session 604.

At operation 503, the system generates a rendering of the 3D environment 200 using the first viewing perspective 121A associated with the first entity 131A for display on a display device 11A associated with the first user 10A. This view is generated by the use of the original model data 190. FIG. 2 shows an example where the rendering includes entities that are positioned within the first viewing perspective 121A to the first user 10A.

At operation 505, the system determines that an input identifying an event meets a preset condition. An event can meet a preset condition based on one or more factors. For example, a system can determine that an event meets a preset condition when users having a threshold level of affiliation e.g., members of a corporate team, have a threshold level of activity, e.g., 80% of team is cheering. An event can also meet a preset condition by a single action as well, e.g., a presenter mentions that Team X has won an award. This way, if the presenter mentions that Team X and Team Y has each won awards, each team can see the team reacting in individual groups without having to see members of other teams, e.g., Team X members do not see Team Y members, and vice versa.

At operation 507, the system generates parameters of the temporary viewing perspective 321, wherein the parameters of the temporary viewing perspective 321 include a threshold number of entities associated with the users 10A-10Z associated with the threshold level of activity. The individual entities 131A-131Z are positioned within the temporary viewing perspective 321 of a virtual camera 320. The system also determines coordinates for a second point of view 322 for the virtual camera 320, wherein the temporary viewing perspective 321 originates from the second point of view 322.

At operation 509, the system 100 causes a transition from the rendering 251 of the 3D environment 200 using the first viewing perspective 121A originating from a point of view 111A positioned in association with the first entity 131A to a rendering 252 of the temporary viewing perspective 321 that originates from the second point of view 322 and uses parameters in response to activity signals indicating the threshold level of activity. In some embodiments, the rendering of the individual entities positioned within the temporary viewing perspective of a virtual camera is displayed on the display device until the activity of the subset 221 of users falls below a second threshold level. The renderings can also return to the original view after a predetermined time.

Figure 9:
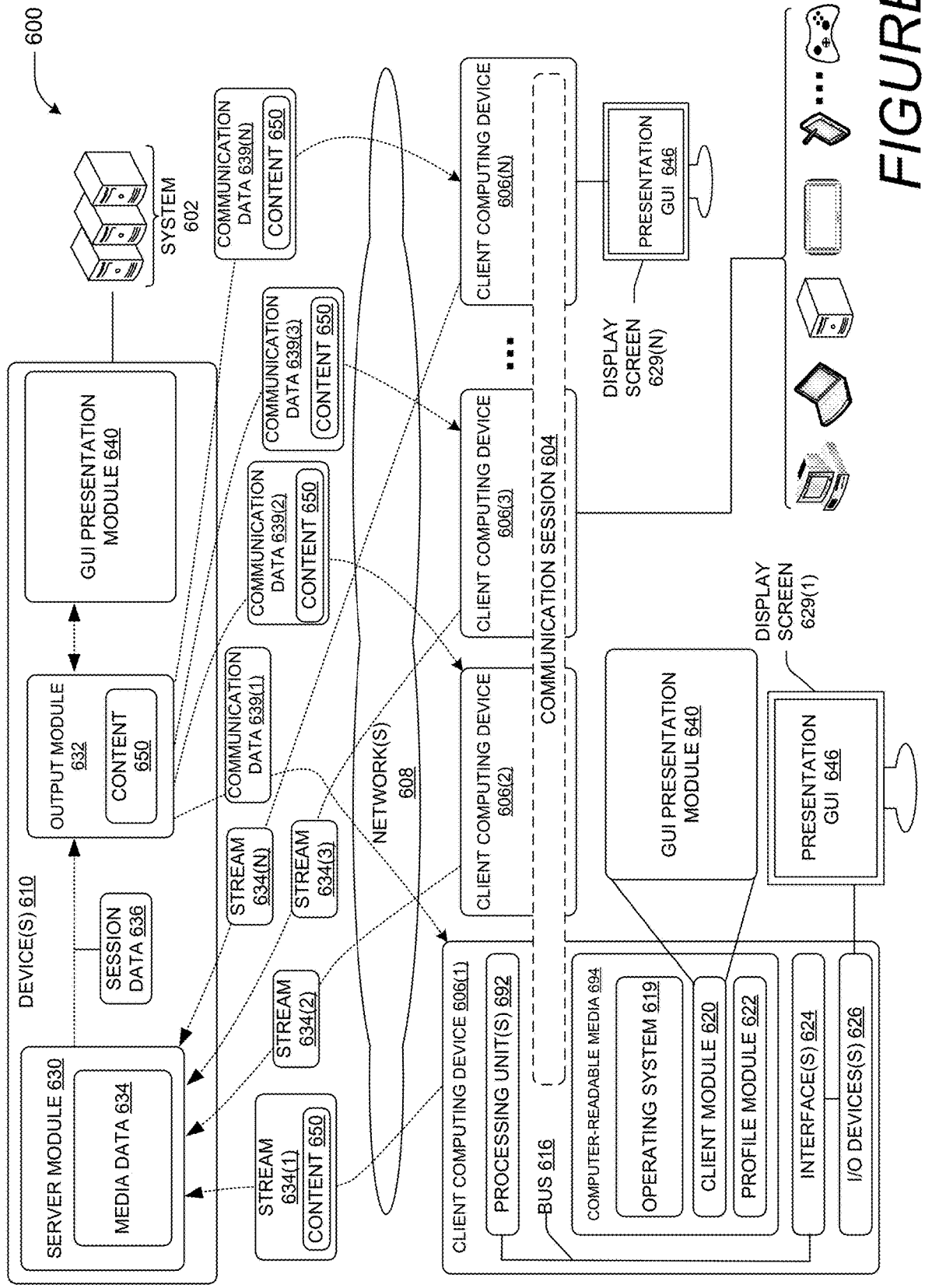
FIG. 9 is a computer architecture diagram illustrating an illustrative computer hardware and software architecture for a computing system capable of implementing aspects of the techniques and technologies presented herein.

FIG. 9 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media

694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 9 illustrates that client computing device 606(1) is in some way connected to a display device (e.g., a display screen 629(N)), which can display a UI according to the techniques described herein.

In the example environment 600 of FIG. 9, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 9) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 9, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 10:
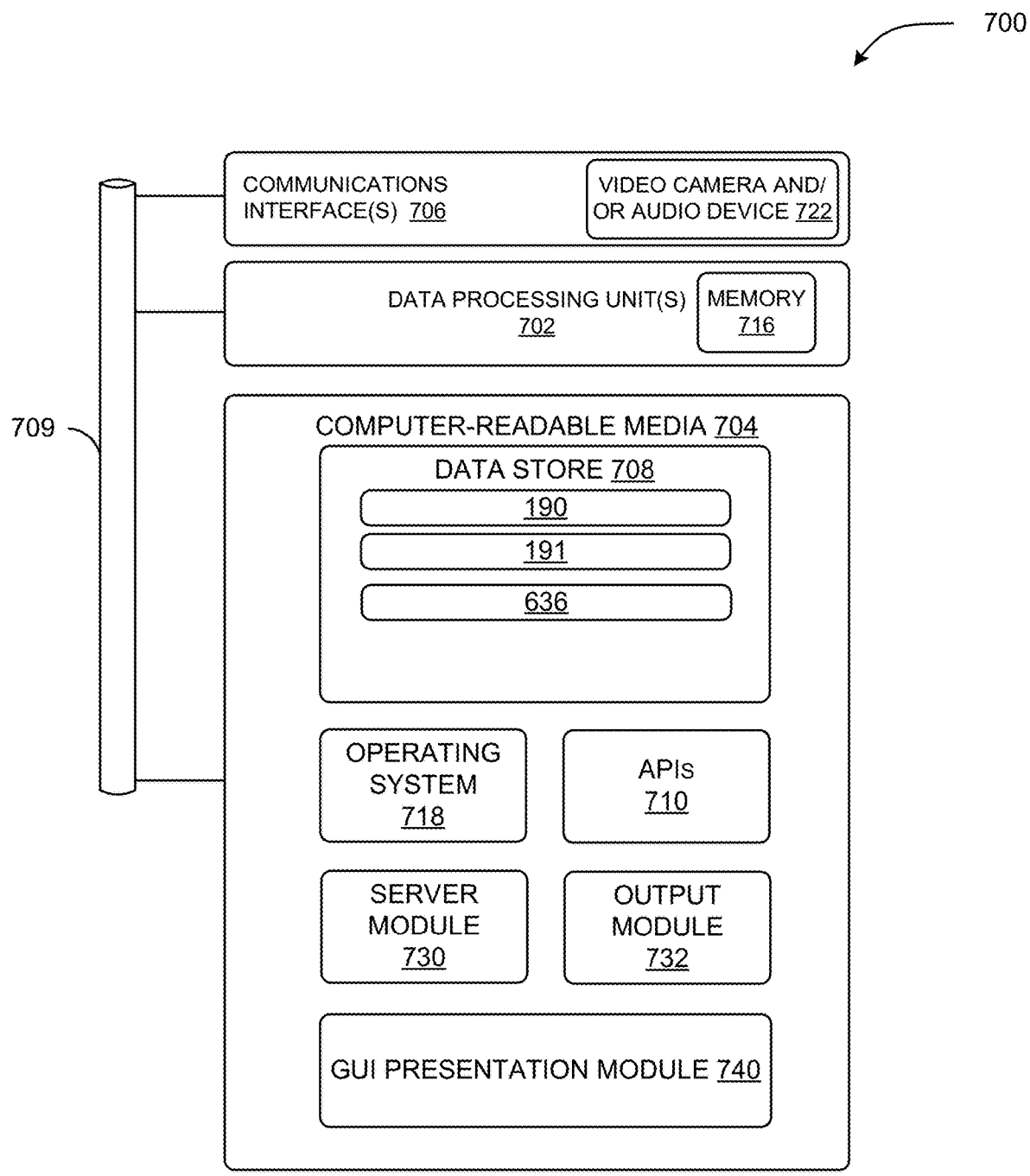
FIG. 10 is a computer architecture diagram illustrating a computing device architecture for a computing device capable of implementing aspects of the techniques and technologies presented herein.

FIG. 10 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store a data structure 190, the supplemental data 191, and session data 636. The supplemental data 191 can define the parameters of the temporary viewing perspective 321 and the coordinate of the path for the interim viewing perspectives. The session data 636 can include a total number of participants (e.g., users and/or client computing devices) in a communication session, activity that occurs in the communication session, a list of invitees to the communication session, and/or other data related to when and how the communication session is conducted or hosted. The session data may also include contextual data, such as the content that includes video, audio, or other content for rendering and display on one or more of the display screens. The session data may also define permissions that allow or restrict each computer in the system to display select renderings or make any of the user interface transitions disclosed herein.

Hardware data 711 can define aspects of any device, such as a number of display screens of a computer. The contextual data can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following Clauses are to supplement the present disclosure.

Clause A: A method, executed by a computing system 700, for promoting engagement by transitioning to a temporary viewing perspective 321 from a first viewing perspective 121A associated with a first entity 131A that is one of a plurality of entities 131A-131ZZ positioned within a 3D environment 200, method comprising: FIG. 1: a virtual reality model positions representations in a large environment, e.g., a stadium. Each person has an original perspective of the environment from their POV, accessing a data structure 190 defining the 3D environment 200, the data structure 190 defines a position 132 and an orientation 113 for each entity of the plurality of entities 131 of the 3D environment 200, the data structure 190 defines the first viewing perspective 121A that originates from a point of view 111A of the first entity 131A; //FIG. 2: The system displays the first viewing perspective 121A to the First User, enerating a rendering 251 of the 3D environment 200 using the first viewing perspective 121A originating from a point of view 111A positioned in association with the first entity 131A for display on a display device 11A associated with the first user 10A; FIG. 3: receiving signals from users having a threshold level of activity e.g., 80% of team is cheering, receiving activity signals from a subset of computing devices 11A-11Z associated with a subset 221 of users 10A-10Z that are members of a predetermined group, wherein the activity signals indicate a threshold level of activity of the subset 221 of users 10AA-10Z; determining that the signals meet the threshold level of activity of the subset 221 of users 10AA-10Z; in response to determining the activity signals indicating the threshold level of activity of the subset 221 of users 10A-10Z that are members of the predetermined group: FIG. 4: determine parameters for the group view of Team Members, e.g., having a "threshold level of affiliation" landing view, determining parameters of the temporary viewing perspective 321, wherein the parameters of the temporary viewing perspective 321 include a threshold number of entities of the users 10A-10Z associated with the threshold level of activity, wherein individual entities 131A-131Z of the users 10A-10Z associated with the threshold level of activity are positioned within the temporary viewing perspective 321 of a virtual camera 320; determining coordinates for a second point of view 322 for the virtual camera 320, wherein the temporary viewing perspective 321 originates from the second point of view 322; and FIG. 2 and FIG. 6: view transition, transitioning the rendering 251 of the 3D environment 200 using the first viewing perspective 121A originating from a point of view 111A positioned in association with the first entity 131A to a rendering 252 of the temporary viewing perspective 321 that originates from the second point of view 322 and uses the parameters that are generated in response to activity signals indicating the threshold level of activity.

Clause B: The method of any of the Clauses, wherein the rendering of the individual entities positioned within the temporary viewing perspective of a virtual camera is displayed on the display device until the activity of the subset 221 of users falls below a second threshold level. The view returns to the main perspective after the activity stops.

Clause C: The method of any of the Clauses: further comprising: determining that the subset 221 of users 10A-10Z have a threshold level of affiliation with one another, and wherein the computing system restricts the transition from the rendering 251 of the 3D environment 200 using the first viewing perspective 121A to the rendering 252 of the temporary viewing perspective 321 until the subset 221 of users 10A-10Z has the threshold level of affiliation with one another.

Clause D: The method of any of the Clauses: further comprising: determining parameters for a path comprising a number of intermediate viewing perspectives 311, wherein the path starts with a first point of view 111A of the first viewing perspective 121A and ends with the second point of view 322 of the temporary viewing perspective 321, wherein the transition between the rendering 251 using the first viewing perspective 121A and the rendering 252 of the temporary viewing perspective 321 further comprises generating an animation showing renderings from the intermediate viewing perspectives 311 of the path between the display of the rendering 251 using the first viewing perspective 121A and the rendering 252 of the temporary viewing perspective 321.

Clause E: The method of any of the Clauses, wherein the intermediate viewing perspectives and points of view that are associated with the intermediate viewing perspectives are positioned to capture images of select entities associated with the users 10A-10Z associated with the threshold level of activity, wherein the images of the select entities includes entities that are not positioned within the temporary viewing perspective 321 of a virtual camera 320.

Clause F: The method of any of the Clauses, wherein permissions are modified in response to determining the activity signals indicate the threshold level of activity of the subset 221 of users 10A-10Z, wherein the modified permission allow the subset of computing devices of the users 10A-10Z to display the rendering 252 of the temporary viewing perspective 321 that originates from the second point of view 322.

Clause G: The method of any of the Clauses, wherein the modified permission restrict a second set of computing devices 10AA-10ZZ of other users 10AA-10ZZ from displaying the rendering 252 of the temporary viewing perspective 321 that originates from the second point of view 322.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method, executed by a computing system, for promoting engagement by transitioning to a temporary viewing perspective from a first viewing perspective associated with a first entity that is one of a plurality of entities positioned within a 3D environment, method comprising:
    accessing a data structure defining the 3D environment, the data structure defines a position and an orientation for each entity of the plurality of entities of the 3D environment, the data structure defines the first viewing perspective that originates from a point of view of the first entity;
    generating a rendering of the 3D environment using the first viewing perspective originating from a point of view positioned in association with the first entity for display on a display device associated with the first user;
    receiving activity signals from a subset of computing devices associated with a subset of users that are members of a predetermined group, wherein the activity signals indicate a threshold level of activity of the subset of users;
    determining that the signals meet the threshold level of activity of the subset of users;
    in response to determining the activity signals indicating the threshold level of activity of the subset of users that are members of the predetermined group:
        determining parameters of the temporary viewing perspective, wherein the parameters of the temporary viewing perspective include a threshold number of entities of the users associated with the threshold level of activity, wherein individual entities of the users associated with the threshold level of activity are positioned within the temporary viewing perspective of a virtual camera;
        determining coordinates for a second point of view for the virtual camera, wherein the temporary viewing perspective originates from the second point of view; and
        transitioning the rendering of the 3D environment using the first viewing perspective originating from a point of view positioned in association with the first entity to a rendering of the temporary viewing perspective that originates from the second point of view and uses the parameters that are generated in response to activity signals indicating the threshold level of activity.

2. The method of claim 1, wherein the rendering of the individual entities positioned within the temporary viewing perspective of a virtual camera is displayed on the display device until the activity of the subset of users falls below a second threshold level.

3. The method of claim 1, further comprising: determining that the subset of users have a threshold level of affiliation with one another, and wherein the computing system restricts the transition from the rendering of the 3D environment using the first viewing perspective to the rendering of the temporary viewing perspective until the subset of users has the threshold level of affiliation with one another.

4. The method of claim 1, further comprising: determining parameters for a path comprising a number of intermediate viewing perspectives, wherein the path starts with a first point of view of the first viewing perspective and ends with the second point of view of the temporary viewing perspective, wherein the transition between the rendering using the first viewing perspective and the rendering of the temporary viewing perspective further comprises generating an animation showing renderings from the intermediate viewing perspectives of the path between the display of the rendering using the first viewing perspective and the rendering of the temporary viewing perspective.

5. The method of claim 4, wherein the intermediate viewing perspectives and points of view that are associated with the intermediate viewing perspectives are positioned to capture images of select entities associated with the users associated with the threshold level of activity, wherein the images of the select entities includes entities that are not positioned within the temporary viewing perspective of a virtual camera.

6. The method of claim 1, wherein permissions are modified in response to determining the activity signals indicate the threshold level of activity of the subset of users, wherein the modified permission allow the subset of computing devices of the users to display the rendering of the temporary viewing perspective that originates from the second point of view.

7. The method of claim 1, wherein the modified permission restrict a second set of computing devices of other users from displaying the rendering of the temporary viewing perspective that originates from the second point of view.

8. A computing device for promoting engagement by transitioning to a temporary viewing perspective from a first viewing perspective associated with a first entity that is one of a plurality of entities positioned within a 3D environment, the computing device comprising:
    one or more processing units; and
    a computer-readable storage device having encoded thereon computer-executable instructions to cause the one or more processing units to:
    access a data structure defining the 3D environment, the data structure defines a position and an orientation for each entity of the plurality of entities of the 3D environment, the data structure defines the first viewing perspective that originates from a point of view of the first entity;
    generate a rendering of the 3D environment using the first viewing perspective originating from a point of view positioned in association with the first entity for display on a display device associated with the first user;
    receive activity signals from a subset of computing devices associated with a subset of users that are members of a predetermined group, wherein the activity signals indicate a threshold level of activity of the subset of users;

determine that the signals meet the threshold level of activity of the subset of users;

determine parameters of the temporary viewing perspective, wherein the parameters of the temporary viewing perspective include a threshold number of entities associated with the users associated with the threshold level of activity, wherein the individual entities are positioned within the temporary viewing perspective of a virtual camera;

determine coordinates for a second point of view for the virtual camera, wherein the temporary viewing perspective originates from the second point of view; and in response to determining the activity signals indicating the threshold level of activity of the subset of users that are members of the predetermined group, transition the rendering of the 3D environment using the first viewing perspective originating from a point of view positioned in association with the first entity to a rendering of the temporary viewing perspective that originates from the second point of view and uses the parameters that are generated in response to activity signals indicating the threshold level of activity.

9. The computing device of claim 8, wherein the rendering of the individual entities positioned within the temporary viewing perspective of a virtual camera is displayed on the display device until the activity of the subset of users falls below a second threshold level.

10. The computing device of claim 8, wherein the computer-executable instructions further cause the one or more processing units to: determine that the subset of users have a threshold level of affiliation with one another, and wherein the computing system restricts the transition from the rendering of the 3D environment using the first viewing perspective to the rendering of the temporary viewing perspective until the subset of users has the threshold level of affiliation with one another.

11. The computing device of claim 8, wherein the computer-executable instructions further cause the one or more processing units to: determine parameters for a path comprising a number of intermediate viewing perspectives, wherein the path starts with a first point of view of the first viewing perspective and ends with the second point of view of the temporary viewing perspective, wherein the transition between the rendering using the first viewing perspective and the rendering of the temporary viewing perspective further comprises generating an animation showing renderings from the intermediate viewing perspectives of the path between the display of the rendering using the first viewing perspective and the rendering of the temporary viewing perspective.

12. The computing device of claim 11, wherein the intermediate viewing perspectives and points of view that are associated with the intermediate viewing perspectives are positioned to capture images of select entities associated with the users associated with the threshold level of activity, wherein the images of the select entities includes entities that are not positioned within the temporary viewing perspective of a virtual camera.

13. The computing device of claim 11, wherein permissions are modified in response to determining the activity signals indicate the threshold level of activity of the subset of users, wherein the modified permission allow the subset of computing devices of the users to display the rendering of the temporary viewing perspective that originates from the second point of view.

14. The computing device of claim 8, wherein the modified permission restrict a second set of computing devices of other users from displaying the rendering of the temporary viewing perspective that originates from the second point of view.

15. A computer-readable storage device having encoded thereon computer-executable instructions for promoting engagement by transitioning to a temporary viewing perspective from a first viewing perspective associated with a first entity that is one of a plurality of entities positioned within a 3D environment, the computer-executable instructions to cause the one or more processing units of a computing device to:

access a data structure defining the 3D environment, the data structure defines a position and an orientation for each entity of the plurality of entities of the 3D environment, the data structure defines the first viewing perspective that originates from a point of view of the first entity;

generate a rendering of the 3D environment using the first viewing perspective originating from a point of view positioned in association with the first entity for display on a display device associated with the first user;

receive activity signals from a subset of computing devices associated with a subset of users that are members of a predetermined group, wherein the activity signals indicate a threshold level of activity of the subset of users;

determine that the signals meet the threshold level of activity of the subset of users;

determine parameters of the temporary viewing perspective, wherein the parameters of the temporary viewing perspective include a threshold number of entities associated with the users associated with the threshold level of activity, wherein the individual entities are positioned within the temporary viewing perspective of a virtual camera;

determine coordinates for a second point of view for the virtual camera, wherein the temporary viewing perspective originates from the second point of view; and in response to determining the activity signals indicating the threshold level of activity of the subset of users that are members of the predetermined group, transition the rendering of the 3D environment using the first viewing perspective originating from a point of view positioned in association with the first entity to a rendering of the temporary viewing perspective that originates from the second point of view and uses the parameters that are generated in response to activity signals indicating the threshold level of activity.

16. The computer-readable storage device of claim 15, wherein the rendering of the individual entities positioned within the temporary viewing perspective of a virtual camera is displayed on the display device until the activity of the subset of users falls below a second threshold level.

17. The computer-readable storage device of claim 15, wherein the computer-executable instructions further cause the one or more processing units to: determine that the subset of users have a threshold level of affiliation with one another, and wherein the computing system restricts the transition from the rendering of the 3D environment using the first viewing perspective to the rendering of the temporary viewing perspective until the subset of users has the threshold level of affiliation with one another.

18. The computer-readable storage device of claim 15, wherein the computer-executable instructions further cause the one or more processing units to: determine parameters for a path comprising a number of intermediate viewing perspectives, wherein the path starts with a first point of view of the first viewing perspective and ends with the second point of view of the temporary viewing perspective, wherein the transition between the rendering using the first viewing perspective and the rendering of the temporary viewing perspective further comprises generating an animation showing renderings from the intermediate viewing perspectives of the path between the display of the rendering using the first viewing perspective and the rendering of the temporary viewing perspective.

19. The computer-readable storage device of claim 18, wherein the intermediate viewing perspectives and points of view that are associated with the intermediate viewing perspectives are positioned to capture images of select entities associated with the users associated with the threshold level of activity, wherein the images of the select entities includes entities that are not positioned within the temporary viewing perspective of a virtual camera.

20. The computer-readable storage device of claim 15, wherein permissions are modified in response to determining the activity signals indicate the threshold level of activity of the subset of users, wherein the modified permission allow the subset of computing devices of the users to display the rendering of the temporary viewing perspective that originates from the second point of view.

* * * * *